United States Patent
Ishikawa

(10) Patent No.: US 9,358,853 B2
(45) Date of Patent: Jun. 7, 2016

(54) VEHICLE HEIGHT ADJUSTING DEVICE, CONTROL DEVICE FOR VEHICLE HEIGHT ADJUSTING DEVICE, AND NON-TRANSITORY COMPUTER READABLE MEDIUM

(71) Applicant: Showa Corporation, Gyoda-shi (JP)

(72) Inventor: Fumiaki Ishikawa, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/492,568

(22) Filed: Sep. 22, 2014

(65) Prior Publication Data

US 2015/0273970 A1 Oct. 1, 2015

(30) Foreign Application Priority Data

Mar. 28, 2014 (JP) ................................. 2014-070421

(51) Int. Cl.
*B60G 17/018* (2006.01)
*B60G 17/0165* (2006.01)
(Continued)

(52) U.S. Cl.
CPC .......... *B60G 17/0165* (2013.01); *B60G 15/065* (2013.01); *B60G 17/016* (2013.01); *B60G 17/019* (2013.01); *B60G 17/0152* (2013.01); *B60G 17/0272* (2013.01); *B60G 17/0565* (2013.01); *B62K 25/00* (2013.01); *B60G 2202/154* (2013.01); *B60G 2300/12* (2013.01); *B60G 2400/0511* (2013.01); *B60G 2400/0512* (2013.01); *B60G 2400/204* (2013.01); *B60G 2400/252* (2013.01); *B60G 2400/824* (2013.01); *B60G 2500/30* (2013.01); *B60G 2800/014* (2013.01); *B60G 2800/0122* (2013.01); *B60G 2800/912* (2013.01); *B60G 2800/914* (2013.01); *B62K 2025/045* (2013.01); *B62K 2025/048* (2013.01)

(58) Field of Classification Search
USPC ............................................................. 701/37
See application file for complete search history.

(56) References Cited

U.S. PATENT DOCUMENTS 4,568,101 A 2/1986 Bleustein et al.
4,616,847 A * 10/1986 Kanai ................ B60G 17/0162
280/124.145

(Continued)

FOREIGN PATENT DOCUMENTS

DE 19548721 A 7/1997
DE 102008006051 A 7/2009
(Continued)

OTHER PUBLICATIONS

U.S. Appl. No. 14/226,065, filed Mar. 26, 2014, Kasuga et al.
(Continued)

*Primary Examiner* — Hussein A. Elchanti
(74) *Attorney, Agent, or Firm* — Leason Ellis LLP

(57) ABSTRACT

A vehicle height adjusting device includes a front fork and a rear suspension capable of changing a relative position between a vehicle body frame and wheels (front wheel, rear wheel) of a motorcycle, and a control device for controlling the front fork and the rear suspension. The control device includes a driving scene determination unit that determines a driving scene of the motorcycle on the basis of driving information, and a control unit that controls the front fork and the rear suspension in response to the determined driving scene.

7 Claims, 16 Drawing Sheets

(51) Int. Cl.
*B60G 15/06* (2006.01)
*B60G 17/016* (2006.01)
*B60G 17/027* (2006.01)
*B60G 17/056* (2006.01)
*B62K 25/00* (2006.01)
*B60G 17/015* (2006.01)
*B60G 17/019* (2006.01)
*B62K 25/04* (2006.01)

(56) References Cited

U.S. PATENT DOCUMENTS

| | | | | |
|---|---|---|---|---|
| 5,711,390 A * | 1/1998 | Hikichi | ............... | B62K 11/00 180/219 |
| 6,168,171 B1 * | 1/2001 | Shono | ............... | B60G 17/005 280/5.507 |
| 7,216,024 B1 * | 5/2007 | Abels | ............... | B60T 8/241 340/685 |
| 7,270,211 B1 * | 9/2007 | Jones | ............... | B62K 25/08 180/219 |
| 8,672,334 B1 | 3/2014 | Murakami et al. | | |
| 8,977,442 B2 * | 3/2015 | Menzenbach | ....... | B62D 7/1509 701/50 |
| 2004/0108663 A1 * | 6/2004 | Rickers | ............... | B60G 9/02 280/6.154 |
| 2004/0254702 A1 * | 12/2004 | Mueller | ............... | B62H 1/10 701/38 |
| 2005/0021205 A1 | 1/2005 | Niwa et al. | | |
| 2006/0142916 A1 * | 6/2006 | Onuma | ............... | B60G 17/015 701/38 |
| 2006/0180384 A1 * | 8/2006 | Malvestio | ............... | B60G 9/02 180/417 |
| 2006/0250297 A1 * | 11/2006 | Prakah-Asante | ... | B60R 21/0134 342/70 |
| 2009/0062985 A1 * | 3/2009 | Ohashi | ............... | B60G 17/04 701/37 |
| 2009/0069993 A1 * | 3/2009 | Inoue | ............... | B60W 40/06 701/70 |
| 2010/0230876 A1 * | 9/2010 | Inoue | ............... | B60G 11/27 267/140.14 |
| 2010/0320703 A1 * | 12/2010 | Lin | ............... | B60G 17/018 280/5.507 |
| 2012/0067122 A1 | 3/2012 | Sakamoto et al. | | |
| 2012/0074660 A1 | 3/2012 | Thomas | | |
| 2014/0049013 A1 * | 2/2014 | Dehmel | ............... | B60G 11/27 280/6.157 |
| 2014/0077466 A1 | 3/2014 | Murakami et al. | | |
| 2014/0095023 A1 * | 4/2014 | Myggen | ............... | B60G 17/016 701/37 |
| 2014/0129087 A1 * | 5/2014 | Takenaka | ............... | B62K 21/00 701/41 |
| 2014/0172244 A1 * | 6/2014 | Lee | ............... | B60P 3/40 701/49 |
| 2014/0195112 A1 * | 7/2014 | Lu | ............... | B60G 17/015 701/37 |
| 2014/0212003 A1 * | 7/2014 | Ono | ............... | G01P 3/806 382/107 |
| 2014/0236425 A1 | 8/2014 | Savaresi et al. | | |
| 2014/0265224 A1 * | 9/2014 | Takenaka | ............... | B62K 21/10 280/274 |

FOREIGN PATENT DOCUMENTS

| | | |
|---|---|---|
| EP | 2902222 A | 8/2015 |
| JP | 62-020782 A | 1/1987 |
| JP | 10-281205 A | 10/1998 |
| JP | 2000-322695 A | 11/2000 |
| JP | 2004-345571 A | 12/2004 |
| JP | 2008-094217 A | 4/2008 |
| JP | 2010-047151 A | 3/2010 |
| JP | 2012-066683 A | 4/2012 |
| WO | WO-2005/107358 A | 11/2005 |
| WO | WO-2013/046079 A | 4/2013 |

OTHER PUBLICATIONS

Extended European Search Report mailed Aug. 31, 2015 for the corresponding European Application No. 14186499.1.
Office Action mailed Feb. 5, 2016 for the corresponding Japanese Patent Application No. 2014-070421.

* cited by examiner

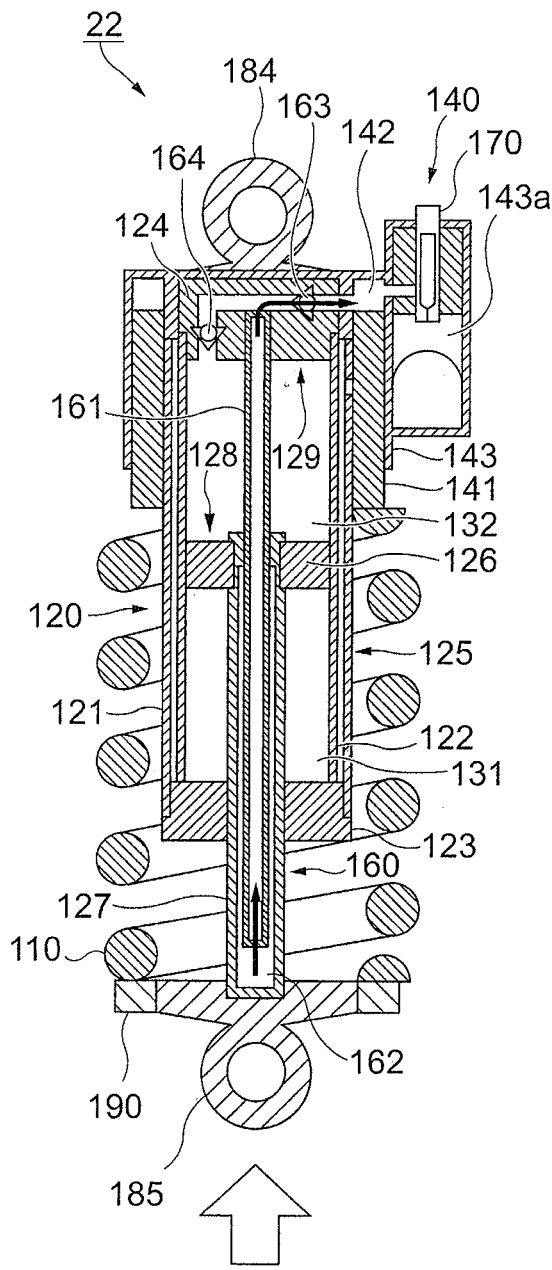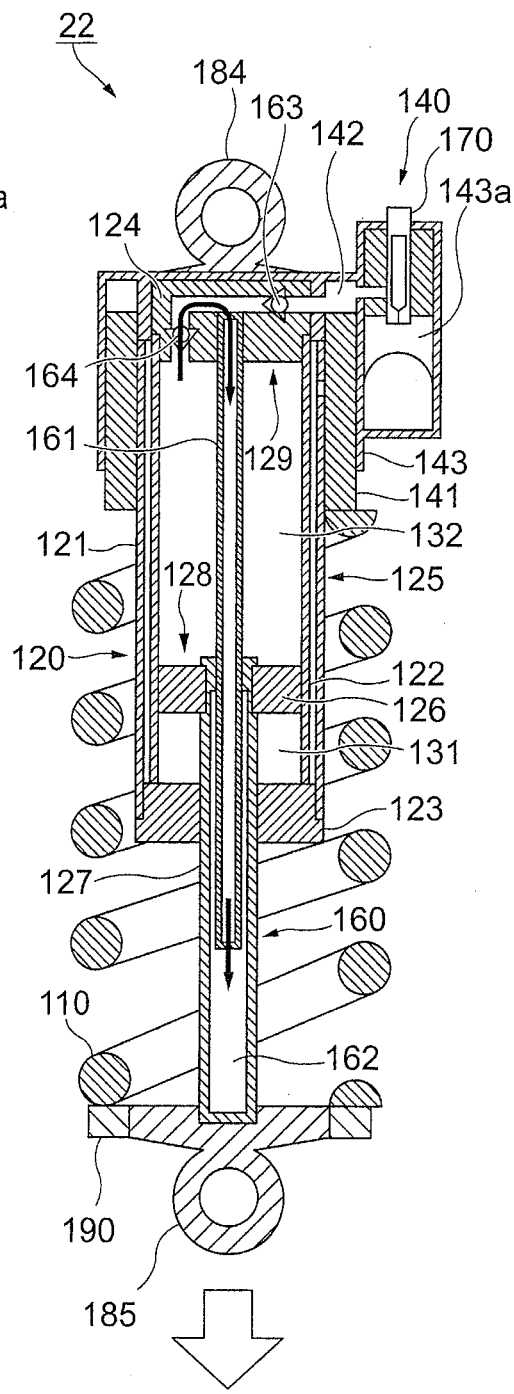
FIG. 3A COMPRESSION PROCESS
FIG. 3B EXTENSION PROCESS

FIG. 7A
COMPRESSION PROCESS
FIG. 7B
EXTENSION PROCESS
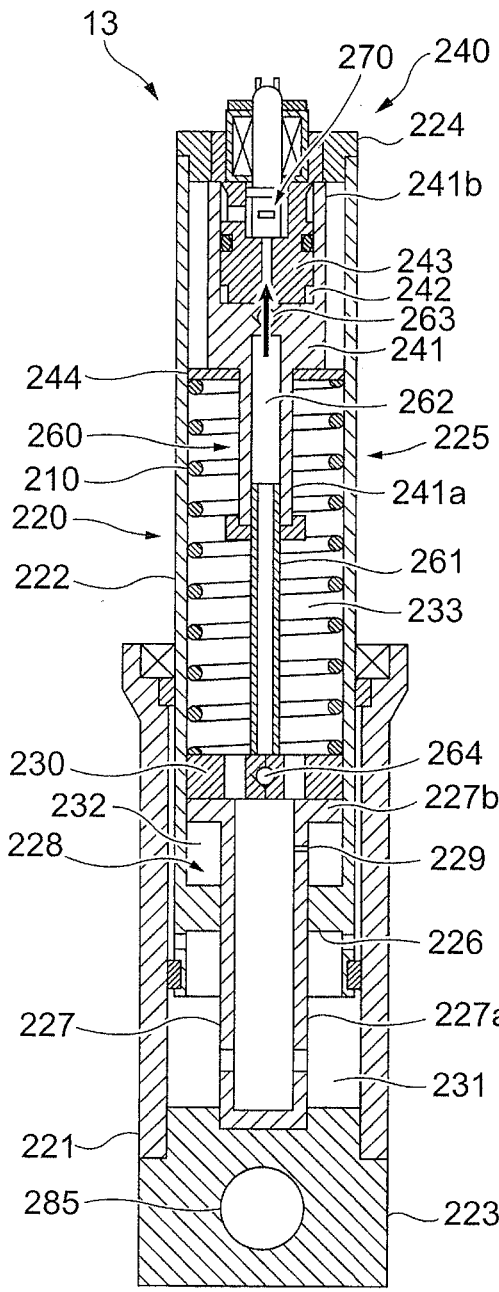
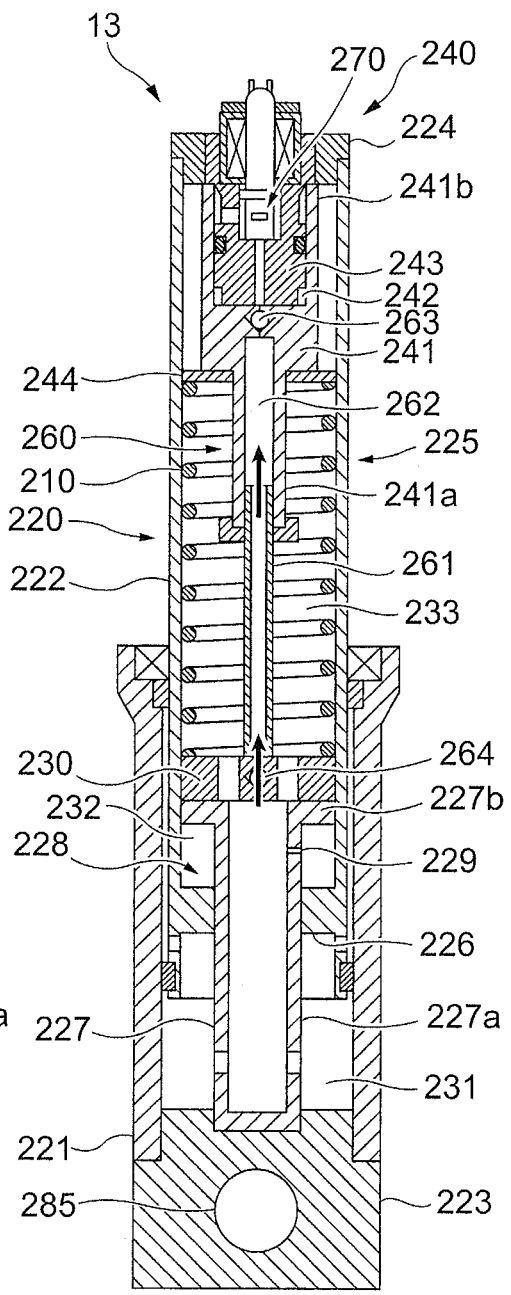

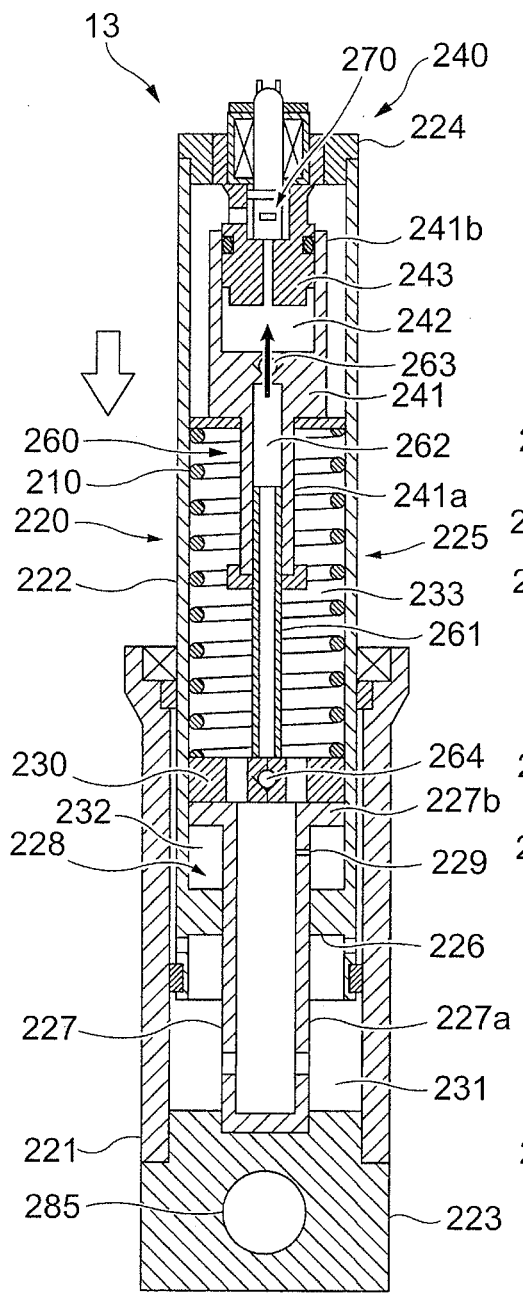
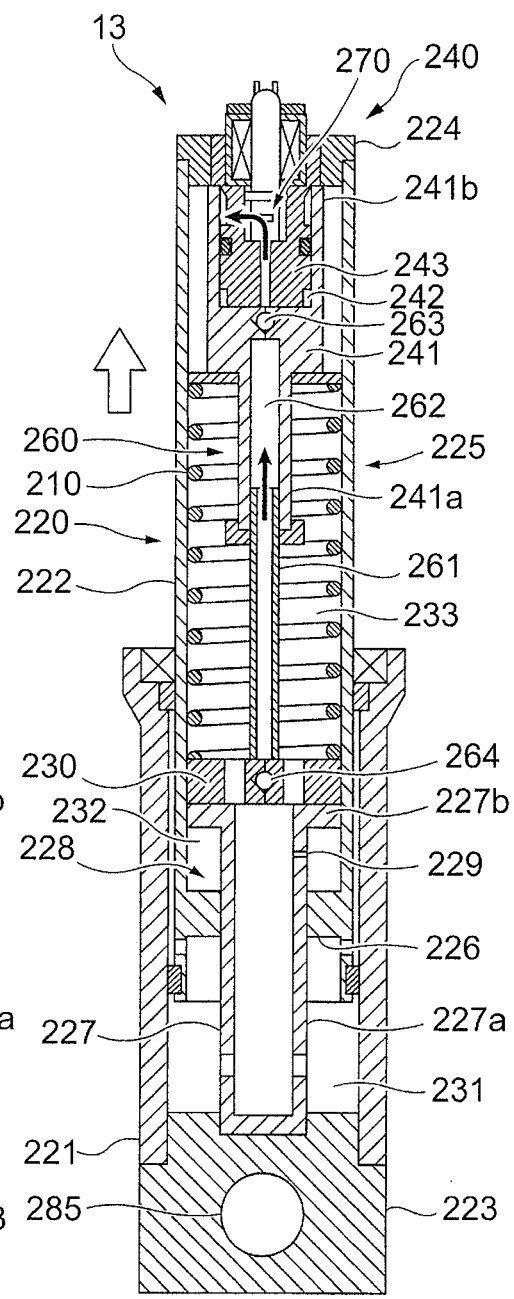

FIG. 14

| DRIVING SCENE | VEHICLE HEIGHT OF FRONT WHEEL SIDE | VEHICLE HEIGHT OF REAR WHEEL SIDE |
|---|---|---|
| CITY STREET | MEDIUM (OR LOW) | MEDIUM (OR LOW) |
| WINDING ROAD | MEDIUM | HIGH |
| EXPRESSWAY | HIGH | MEDIUM |

FRONT WHEEL SIDE TARGET MOVING DISTANCE

REAR WHEEL SIDE TARGET MOVING DISTANCE

VEHICLE HEIGHT ADJUSTING DEVICE, CONTROL DEVICE FOR VEHICLE HEIGHT ADJUSTING DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-070421 filed on Mar. 28, 2014, the entire content of which is incorporated herein by reference.

BACKGROUND OF THE INVENTION

1. Technical Field

The present invention relates to a vehicle height adjusting device, a control device for a vehicle height adjusting device, and a non-transitory computer readable medium storing a program for adjusting the vehicle height of a motorcycle.

2. Related Art

In recent years, devices for raising the vehicle height of motorcycles and the like have been proposed.

Patent Literature 1 (JP-A-2008-94217) discloses a vehicle height adjustment mechanism comprising a pressure sensor (hydraulic pressure detection unit) for detecting the hydraulic pressure that is generated by the telescopic motion of the shock absorber body, and a solenoid valve (hydraulic pressure release unit) for releasing the hydraulic pressure when the hydraulic pressure detected by the pressure sensor exceeds a predetermined value.

Moreover, Patent Literature 2 (JP-A-H10-281205) discloses a vehicle height adjusting device comprising a solenoid value that releases, to the reservoir, the hydraulic oil of the piston lower chamber and the high pressure hydraulic oil storage chamber when the vehicle height becomes a value that is equal to or greater than the target vehicle height value, wherein the solenoid valve is driven by the output signal of a controller that performs the arithmetic processing of the input signal from the vehicle height sensor that is operated relative to the target vehicle height value and the input signal of the vehicle height setting switch for setting the target vehicle height.

SUMMARY OF THE INVENTION

With a vehicle height adjusting device that automatically changes the vehicle height in response to the vehicle speed of the motorcycle, it was only possible to switch between two states; namely, a low state where the vehicle height is low when the motorcycle is stopped, and a high state where the vehicle height is high while the motorcycle is being driven.

Nevertheless, in the foregoing case, there is only one state (high state) of the vehicle height when the motorcycle is being driven, and it cannot necessarily be said that this matches the driving scene of the motorcycle.

An object of the present invention is to provide a vehicle height adjusting device and the like capable of adjusting the vehicle height of the motorcycle according to the driving scene of the motorcycle.

In order to achieve the foregoing object, an aspect of the present invention provides a vehicle height adjusting device comprising a changing unit capable of changing a relative position between a vehicle body of a vehicle and wheels of the vehicle, and a control device that controls the changing unit, in which the control unit includes a driving scene determination unit that determines a driving scene of the vehicle on the basis of driving information, and a control unit that controls the relative position in response to the determined driving scene.

Her; the changing unit may include a front wheel side changing unit changing a front wheel side relative position, which is a relative position between the vehicle body and a front wheel, and a rear wheel side changing unit changing a rear wheel side relative position, which is a relative position between the vehicle body and a rear wheel, and the control unit may perform control of changing at least one of the front wheel side relative position and the rear wheel side relative position in response to the determined driving scene.

Moreover, the driving scene determination unit may determine the driving scene on the basis of a vehicle speed, which is a moving velocity of the vehicle, and an angle of inclination of the vehicle body in a horizontal direction.

In addition, the changing unit may include a solenoid valve which is provided in a fluid distribution channel and an opening of which is controlled according to a supplied power, and the control unit may control the relative position of the changing unit by controlling the opening of the solenoid valve.

Moreover, another aspect of the present invention additionally provides a control device for a vehicle height adjusting device comprising a driving scene determination unit that determines a driving scene of a vehicle on the basis of driving information, and a control unit that controls a changing unit changing a relative position between a vehicle body of the vehicle and wheels of the vehicle in response to the determined driving scene.

Here, the control unit may perform control of changing at least one of a front wheel side relative position, which is a relative position between the vehicle body and a front wheel, and a rear wheel side relative position, which is a relative position between the vehicle body and a rear wheel, on the basis of a front wheel side target moving distance and a rear wheel side target moving distance, in which the front wheel side target moving distance is a target moving distance of the front wheel side relative position, the rear wheel side target moving distance is a target moving distance of the rear wheel side relative position, and the front wheel side target moving distance and the rear wheel side target moving distance are determined according to the driving scene.

In addition, another aspect of the present invention further provides a non-transitory computer readable medium storing a program for causing a computer used in a vehicle height adjusting device to execute a process for adjusting a vehicle height of a vehicle, the process including: determining a driving scene of a vehicle on the basis of driving information; and controlling a changing unit changing a relative position between a vehicle body of the vehicle and wheels of the vehicle in response to the determined driving scene.

According to any one of the aspects of the present invention, it is possible to provide a vehicle height adjusting device and the like capable of adjusting the vehicle height of the motorcycle according to the driving scene of the motorcycle.

BRIEF DESCRIPTION OF THE DRAWINGS

FIGS. 3A and 3B are diagrams explaining the operation of the rear wheel side liquid supplying device;

FIGS. 7A and 7B are diagrams explaining the operation of the front wheel side liquid supplying device;

FIGS. 8A and 8B are diagrams explaining the vehicle height adjustment performed by the front wheel side relative position changing device;

FIG. 14 is a table showing the relation between the driving scene of the motorcycle determined by the driving scene determination unit and the vehicle height on the front wheel side and the vehicle height on the rear wheel side;

DETAILED DESCRIPTION OF THE INVENTION

An embodiment of the present invention is now explained in detail with reference to the appended drawings.

Figure 1:
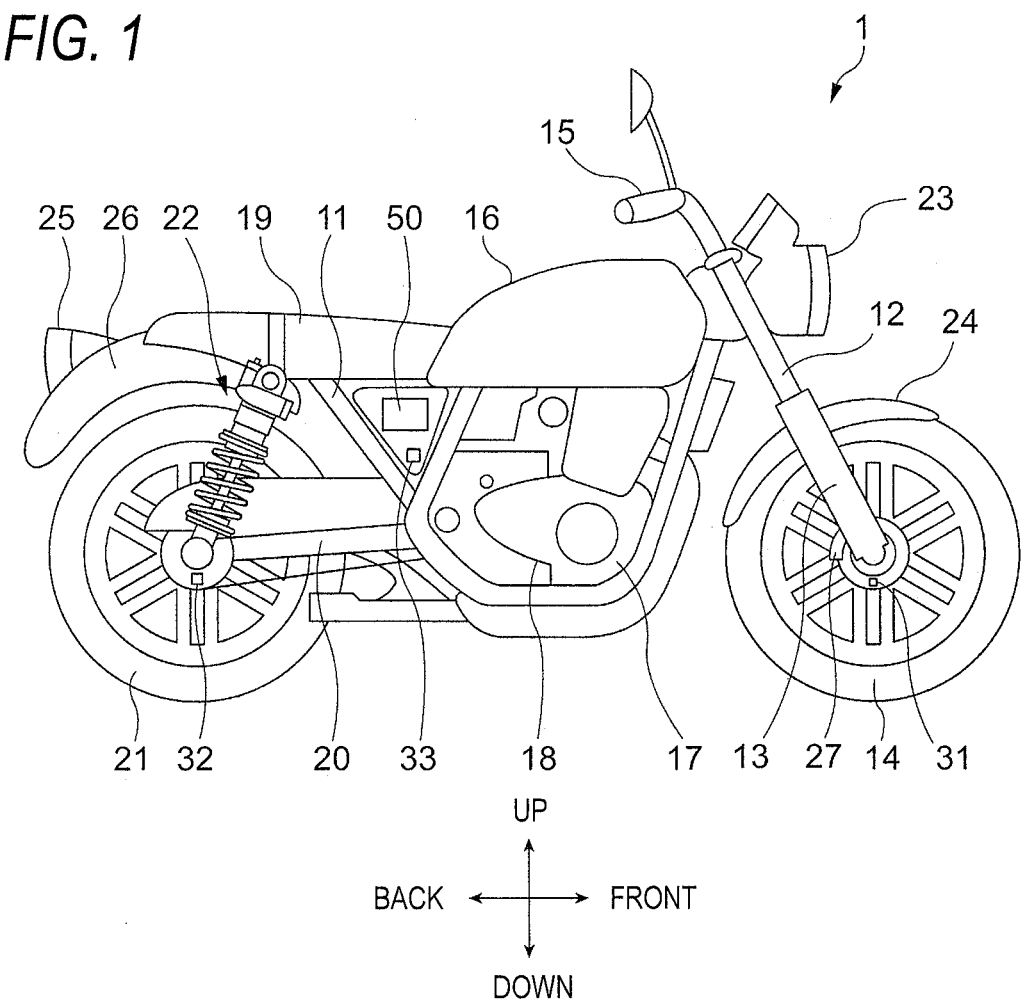
FIG. 1 is a diagram showing a schematic configuration of a motorcycle according to an embodiment of the present invention.

FIG. 1 is a diagram showing a schematic configuration of a motorcycle 1 according to an embodiment of the present invention.

The motorcycle 1 is an example of vehicles in this embodiment.

As shown in FIG. 1, the motorcycle 1 includes a vehicle body frame 11, a head tube 12 that is mounted on a front end part of the vehicle body frame 11, two front forks 13 provided to the head tube 12, and a front wheel 14 mounted on a lower end of the two front forks 13. The two front forks 13 are each disposed on the left side and the right side of the front wheel 14, respectively. In FIG. 1, only the front fork 13 disposed on the right side is shown. The specific configuration of the front fork 13 will be explained in detail later.

Moreover, the motorcycle 1 includes handlebars 15 mounted on the upper part of the front forks 13, a fuel tank 16 mounted on a front upper part of the vehicle body frame 11, and an engine 17 and a transmission 18 that are disposed below the fuel tank 16.

Moreover, the motorcycle 1 includes a seat 19 mounted on a rear upper part of the vehicle body frame 11, a swing arm 20 mounted swingably on a lower part of the vehicle body frame 11, a rear wheel 21 mounted on a rear end of the swing arm 20, and one or two rear suspensions 22 mounted between a rear part (rear wheel 21) of the swing arm 20 and a rear part of the vehicle body frame 11. The one or two rear suspensions 22 are each disposed on the left side and the right side of the rear wheel 21, respectively. In FIG. 1, only the rear suspension 22 disposed on the right side is shown. The specific configuration of the rear suspension 22 will be explained in detail later.

Moreover, the motorcycle 1 includes a headlamp 23 disposed in front of the head tube 12, a front fender 24 mounted on the front forks 13 so as to cover the upper part of the front wheel 14, a tail lamp 25 disposed behind the seat 19, and a rear fender 26 mounted below the tail lamp 25 so as to cover the upper part of the rear wheel 21. Moreover, the motorcycle 1 includes a brake 27 for stopping the rotation of the front wheel 14.

Moreover, the motorcycle 1 includes a front wheel rotation detection sensor 31 for detecting the rotation angle of the front wheel 14, and a rear wheel rotation detection sensor 32 for detecting the rotation angle of the rear wheel 21. Moreover, the motorcycle 1 includes an angle of inclination sensor 33 for detecting the angle of inclination (bank angle) of the motorcycle 1 in the horizontal direction.

Moreover, the motorcycle 1 comprises a control device 50 as an example of the control unit configured to control the opening of a front wheel side solenoid valve 270 (described later) of the front fork 13 and the opening of a rear wheel side solenoid valve 170 (described later) of the rear suspension 22. The control device 50 controls the vehicle height of the motorcycle 1 by controlling the opening of the front wheel side solenoid valve 270 and the rear wheel side solenoid valve 170 described later. Input to the control device 50 are the output signals from the foregoing front wheel rotation detection sensor 31, rear wheel rotation detection sensor 32, angle of inclination sensor 33, and other sensors.

While a detailed explanation will be provided later, the front fork 13, the rear suspension 22, and the control device 50 can be understood as being the vehicle height adjusting device.

The rear suspension 22 is now explained in detail.

Figure 2:
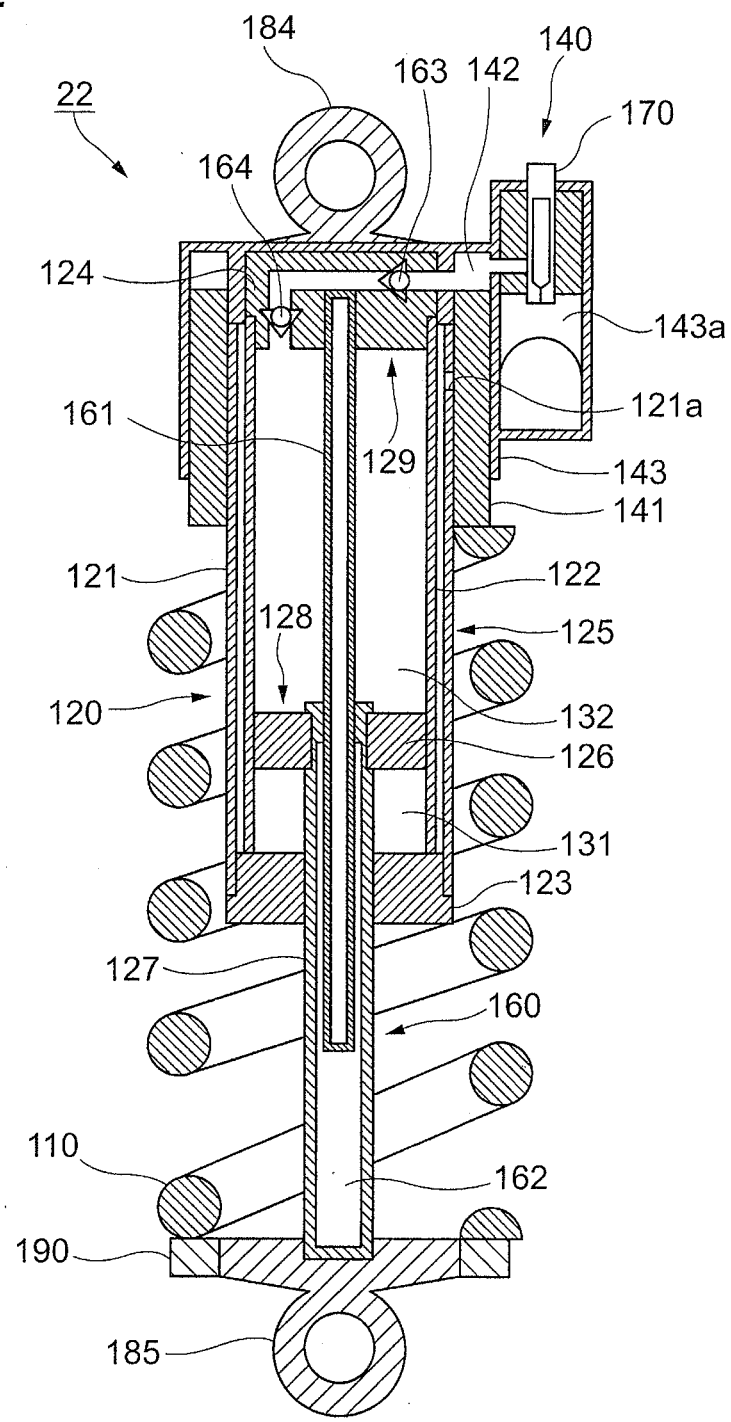
FIG. 2 is a cross section of the rear suspension.

FIG. 2 is a cross section of the rear suspension 22.

The rear suspension 22 is mounted between the vehicle body frame 11, which is an example of the vehicle body of the motorcycle 1, and the rear wheel 21. The rear suspension 22 comprises a rear wheel side suspension spring 110 for supporting the weight of the motorcycle 1 and absorbing shocks, and a rear wheel side damper 120 for damping the vibration of the rear wheel side suspension spring 110. Moreover, the rear suspension 22 comprises a rear wheel side relative position changing device 140 capable of changing a rear wheel side relative position, which is the relative position between the vehicle body frame 11 and the rear wheel 21, by adjusting the spring force of the rear wheel side suspension spring 110, and a rear wheel side liquid supplying device 160 for supplying liquid to the rear wheel side relative position changing device 140. Moreover, the rear suspension 22 comprises a vehicle body side mounting member 184 for mounting the rear suspension 22 on the vehicle body frame 11, an axle side mounting member 185 for mounting the rear suspension 22 on the rear wheel 21, and a spring bearing 190 for supporting one end (lower part in FIG. 2) in a centerline direction of the rear wheel side suspension spring 110 mounted on the axle side mounting member 185. The rear suspension 22 functions as an example of the changing unit configured to change the relative position between the vehicle body frame 11 and the rear wheel 21 as an example of the wheels, and the rear wheel side changing unit.

The rear wheel side damper 120 comprises, as shown in FIG. 2, a cylinder 125 including a thin cylindrical external cylinder 121, a thin cylindrical internal cylinder 122 housed in the external cylinder 121, a bottom cover 123 that covers one end (lower part in FIG. 2) in a cylindrical centerline direction (vertical direction in FIG. 2) of the cylindrical external cylinder 121, and a top cover 124 that covers the other end (upper part in FIG. 2) in the centerline direction of the internal cylinder 122. In the ensuing explanation, the cylindrical centerline direction of the external cylinder 121 is simply referred to as the "centerline direction".

Moreover, the rear wheel side damper 120 comprises a piston 126 that is inserted into the internal cylinder 122 movably in the centerline direction, and a piston rod 127 that extends in the centerline direction and supports the piston 126 with the other end (upper part in FIG. 2) in the centerline direction. The piston 126 comes into contact with the inner peripheral surface of the internal cylinder 122, and partitions the space where the liquid (oil in this embodiment) in the cylinder 125 is enclosed into a first oil chamber 131 on one end side that is more toward the centerline direction than the piston 126, and a second oil chamber 132 on the other end side that is more toward the centerline direction than the piston 126. The piston rod 127 is a cylindrical member, and a pipe 161 described later is inserted therein. In this embodiment, oil functions as an example of the hydraulic oil.

Moreover, the rear wheel side damper 120 comprises a first damping force generation unit 128 disposed on the other end side in the centerline direction of the piston rod 127, and a second damping force generation unit 129 disposed on the other end side in the centerline direction of the internal cylinder 122. The first damping force generation unit 128 and the second damping force generation unit 129 damp the stretching vibration of the cylinder 125 and the piston rod 127 associated with the absorption of the impact force from the road surface by the rear wheel side suspension spring 110. The first damping force generation unit 128 is disposed to function as a communicating path between the first oil chamber 131 and the second oil chamber 132, and the second damping force generation unit 129 is disposed to function as a communicating path between the second oil chamber 132 and a jack chamber 142 (described later) of the rear wheel side relative position changing device 140.

The rear wheel side liquid supplying device 160 is a device for supplying liquid into the jack chamber 142 (described later) of the rear wheel side relative position changing device 140 via a pumping operation based on the telescopic motion of the piston rod 127 relative to the cylinder 125.

The rear wheel side liquid supplying device 160 includes a cylindrical pipe 161 that is fixed to the top cover 124 of the rear wheel side damper 120 in a manner of extending in the centerline direction. The pipe 161 is coaxially inserted into the pump chamber 162, which is the inside of the cylindrical piston rod 127.

Moreover, the rear wheel side liquid supplying device 160 includes a discharge check valve 163 for discharging, toward the jack chamber 142 described later, the liquid in the pump chamber 162 that is pressurized by the movement of the piston rod 127 in the direction of entering the cylinder 125 and the pipe 161, and a suction check valve 164 for sucking the liquid in the cylinder 125 into the pump chamber 162 which becomes a negative pressure by the movement of the piston rod 127 in the direction of exiting from the cylinder 125 and the pipe 161.

FIG. 3A and FIG. 3B are diagrams explaining the operation of the rear wheel side liquid supplying device 160.

When the motorcycle 1 is driven and the rear suspension 22 receives force from a bumpy road surface, the rear wheel side liquid supplying device 160 configured as described above performs a pumping operation based on a telescopic motion where the piston rod 127 enters and exits the cylinder 125 and the pipe 161. When the pump chamber 162 is pressurized by this pumping operation, the liquid in the pump chamber 162 opens the discharge check valve 163 and is discharged toward the jack chamber 142 of the rear wheel side relative position changing device 140 (refer to FIG. 3A), and when the pump chamber 162 becomes a negative pressure, the liquid in the second oil chamber 132 of the cylinder 125 opens the suction check valve 164 and gets sucked into the pump chamber 162 (refer to FIG. 3B).

The rear wheel side relative position changing device 140 includes a supporting member 141 that is disposed so as to cover the outer periphery of the cylinder 125 of the rear wheel side damper 120 and supports the other end (upper part in FIG. 3A and FIG. 3B) in the centerline direction of the rear wheel side suspension spring 110, and a hydraulic jack 143 that is disposed so as to cover the outer periphery of the other end side (upper side in FIG. 3A and FIG. 3B) in the centerline direction of the cylinder 125 and forms the jack chamber 142 together with the supporting member 141. When the liquid in the cylinder 125 is filled in the jack chamber 142 or the liquid is discharged from inside the jack chamber 142, the supporting member 141 moves in the centerline direction relative to the hydraulic jack 143. The vehicle body side mounting member 184 is mounted on the upper part of the hydraulic jack 143, the spring force of the rear wheel side suspension spring 110 changes when the supporting member 141 moves in the centerline direction relative to the hydraulic jack 143 and, consequently, the relative position of the seat 19 relative to the rear wheel 21 also changes.

Moreover, the rear wheel side relative position changing device 140 includes a rear wheel side solenoid valve 170 as a solenoid valve that is provided on a fluid distribution channel between the jack chamber 142 and the liquid retaining chamber 143a formed in the hydraulic jack 143, and which is opened to accumulate, in the jack chamber 142, the liquid that was supplied to the jack chamber 142, and closed to discharge, to the liquid retaining chamber 143a formed in the hydraulic jack 143, the liquid that was supplied to the jack chamber 142. The rear wheel side solenoid valve 170 will be described in detail later. Note that the liquid discharged to the liquid retaining chamber 143a is returned inside the cylinder 125.

Figure 4A:
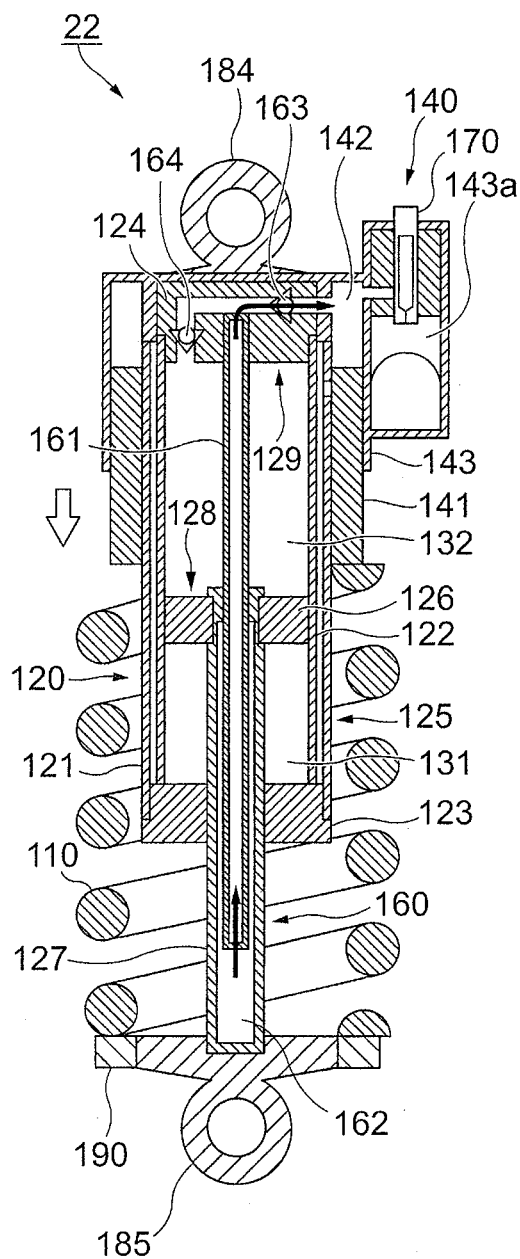
FIGS. 4A and 4B are diagrams explaining the vehicle height adjustment performed by the rear wheel side relative position changing device.
Figure 4B:
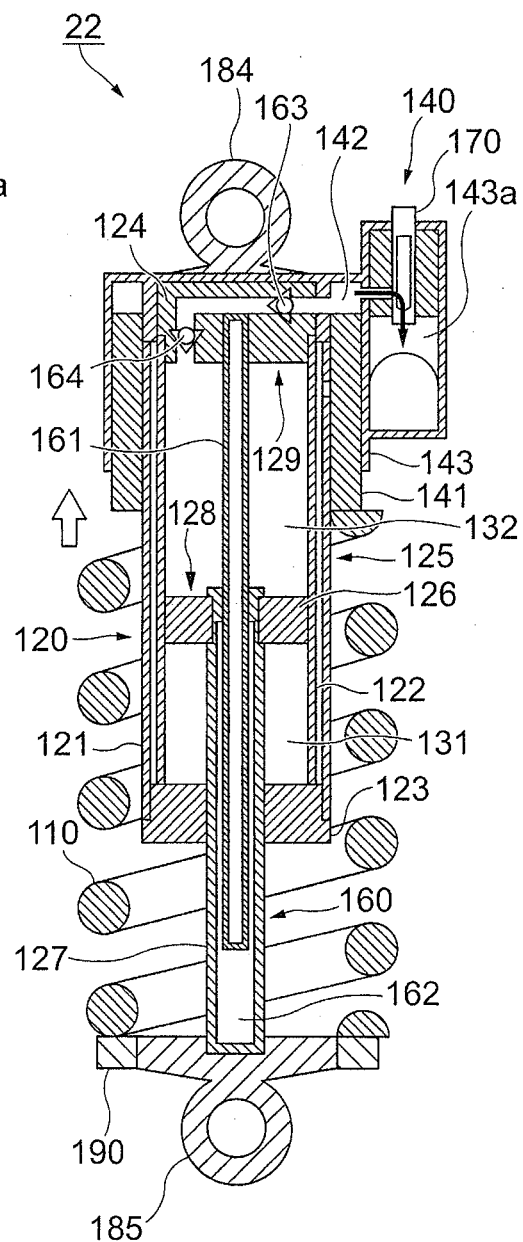

FIG. 4A and FIG. 4B are diagrams explaining the vehicle height adjustment performed by the rear wheel side relative position changing device 140.

When liquid is supplied into the jack chamber 142 by the rear wheel side liquid supplying device 160 in a state where the rear wheel side solenoid valve 170 is even slightly closed from its fully open state, the liquid is filled in the jack chamber 142, the supporting member 141 moves to one end side (lower side in FIG. 4A) in the centerline direction relative to the hydraulic jack 143, and the spring length of the rear wheel side suspension spring 110 becomes shorter (refer to FIG. 4A). Meanwhile, when the rear wheel side solenoid valve 170 is opened fully, the liquid in the jack chamber 142 is discharged to the liquid retaining chamber 143a, the supporting member 141 moves to the other end side (upper side in FIG. 4B) in the centerline direction relative to the hydraulic jack 143, and the spring length of the rear wheel side suspension spring 110 becomes longer (refer to FIG. 4B).

When the spring length of the rear wheel side suspension spring 110 becomes shorter as a result of the supporting member 141 moving relative to the hydraulic jack 143, the spring force of the rear wheel side suspension spring 110 pressing the supporting member 141 becomes greater in comparison to the time before the supporting member 141 moved relative to the hydraulic jack 143. Consequently, even when force works from the vehicle body frame 11 toward the rear wheel 21, the initial load that does not change the relative position of the two is switched. In the foregoing case, when the same force works from the vehicle body frame 11 (seat 19) to the one end side (lower side in FIG. 4A and FIG. 4B) in the centerline direction, the subduction level (change in the distance between the vehicle body side mounting member 184 and the axle side mounting member 185) of the rear suspension 22 will decrease. Thus, when the spring length of the rear wheel side suspension spring 110 becomes shorter as a result of the supporting member 141 moving relative to the hydraulic jack 143, the height of the seat 19 will increase (vehicle height will increase) in comparison to the time before the supporting member 141 moved relative to the hydraulic jack 143. In other words, the vehicle height increases by reducing the opening of the rear wheel side solenoid valve 170.

Meanwhile, when the spring length of the rear wheel side suspension spring 110 becomes longer as a result of the supporting member 141 moving relative to the hydraulic jack 143, the spring force of the rear wheel side suspension spring 110 pressing the supporting member 141 becomes smaller in comparison to the time before the supporting member 141 moved relative to the hydraulic jack 143. In the foregoing case, when the same force works from the vehicle body frame 11 (seat 19) to the one end side (lower side in FIG. 4A and FIG. 4B) in the centerline direction, the subduction level (change in the distance between the vehicle body side mounting member 184 and the axle side mounting member 185) of the rear suspension 22 will increase. Thus, when the spring length of the rear wheel side suspension spring 110 becomes longer as a result of the supporting member 141 moving relative to the hydraulic jack 143, the height of the seat 19 will decrease (vehicle height will decrease) in comparison to the time before the supporting member 141 moved relative to the hydraulic jack 143. In other words, the vehicle height decreases by increasing the opening of the rear wheel side solenoid valve 170.

Note that the opening of the rear wheel side solenoid valve 170 is controlled by the control device 50.

Moreover, when the rear wheel side solenoid valve 170 is opened, the destination of discharging the liquid supplied to the jack chamber 142 may also be the first oil chamber 131 and/or the second oil chamber 132 in the cylinder 125.

Moreover, as shown in FIG. 2, formed on the external cylinder 121 of the cylinder 125 is a return path 121a for returning the liquid in the jack chamber 142 into the cylinder 125 when the supporting member 141 moves up to a predetermined limit position on the one end side (lower side in FIG. 2) in the centerline direction relative to the hydraulic jack 143.

Figure 5:
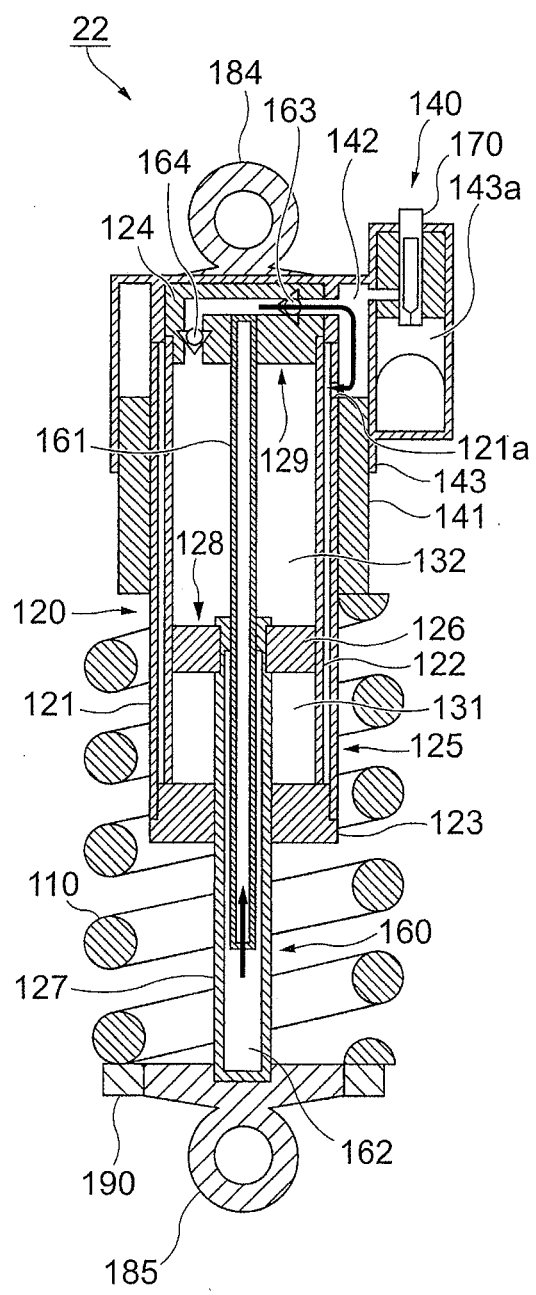
FIG. 5 is a diagram showing the mechanism for maintaining the vehicle height.

FIG. 5 is a diagram showing the mechanism for maintaining the vehicle height.

Even when the liquid is continuously supplied into the jack chamber 142 via the return path 121a when the rear wheel side solenoid valve 170 is fully open, since the supplied liquid is returned into the cylinder 125, the position of the supporting member 141 relative to the hydraulic jack 143, and by extension the height of the seat 19 (vehicle height), is maintained.

Note that, in the ensuing explanation, the state of the rear suspension 22 when the rear wheel side solenoid valve 170 is fully open and the moving distance of the supporting member 141 relative to the hydraulic jack 143 is minimum (zero) is referred to as the "minimum state," and the state of the rear suspension 22 when the rear wheel side solenoid valve 170 is fully closed and the moving distance of the supporting member 141 relative to the hydraulic jack 143 is maximum is referred to as the "maximum state."

Figure 11:
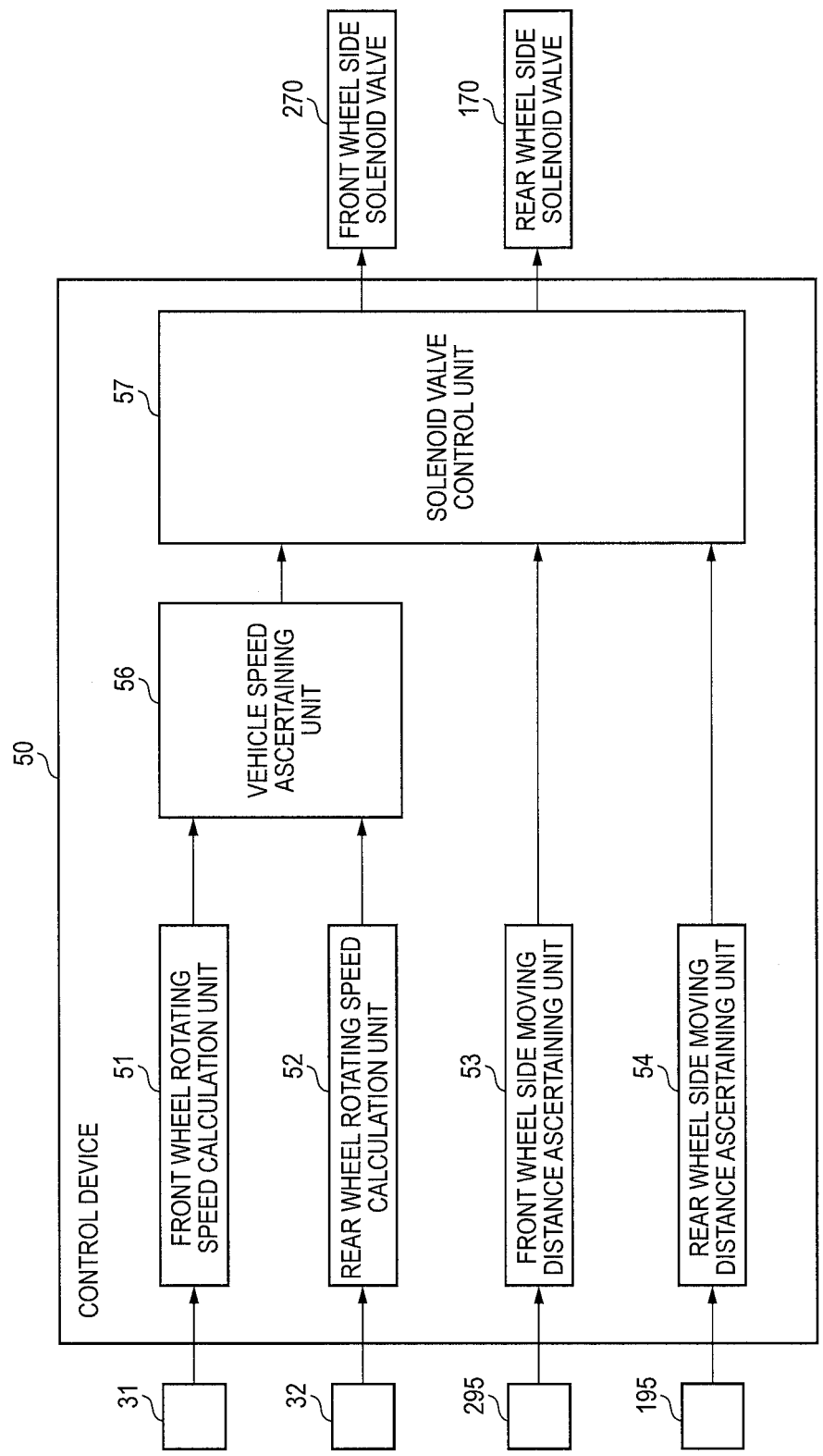
FIG. 11 is a block diagram of the control device.

Moreover, the rear suspension 22 includes a rear wheel side relative position detection unit 195 (refer to FIG. 11). As the rear wheel side relative position detection unit 195, exemplified may be a unit capable of detecting the moving distance of the supporting member 141 in the centerline direction relative to the hydraulic jack 143; that is, the moving distance of the supporting member 141 in the centerline direction relative to the vehicle body side mounting member 184. Specifically, exemplified may be case of winding a coil around the outer peripheral surface of the supporting member 141 and configuring the hydraulic jack 143 from a magnetic body, and using a unit capable of detecting the moving distance of the supporting member 141 on the basis of the impedance of the coil that changes according to the movement of the supporting member 141 in the centerline direction relative to the hydraulic jack 143.

The front fork 13 is now explained in detail.

Figure 6:
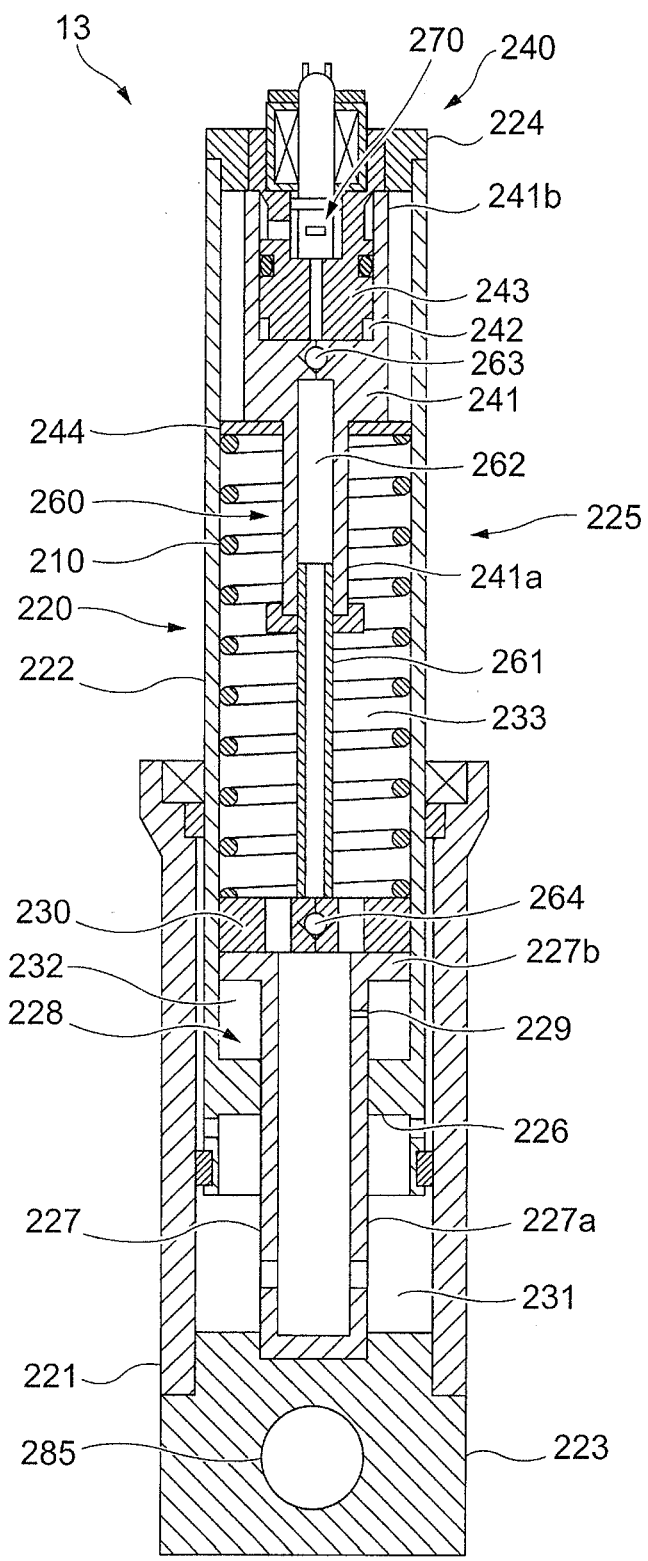
FIG. 6 is a cross section of the front fork.

FIG. 6 is a cross section of the front fork 13.

The front fork 13 is mounted between the vehicle body frame 11 and the front wheel 14. The front fork 13 comprises a front wheel side suspension spring 210 for supporting the weight of the motorcycle 1 and absorbing shocks, and a front wheel side damper 220 for damping the vibration of the front wheel side suspension spring 210. Moreover, the front fork 13 comprises a front wheel side relative position changing device 240 capable of changing the front wheel side relative position, which is the relative position between the vehicle body frame 11 and the front wheel 14, by adjusting the spring force of the front wheel side suspension spring 210, and a front wheel side liquid supplying device 260 for supplying liquid to the front wheel side relative position changing device 240. Moreover, the front fork 13 comprises an axle side mounting part 285 for mounting the front fork 13 on the front wheel 14, and a head tube-side mounting part (not shown) for mounting the front fork 13 on the head tube 12. The front fork 13 functions as an example of the changing unit configured to change the relative position between the vehicle body frame 11 and the front wheel 14 as an example of the wheels, and the front wheel side changing unit.

The front wheel side damper 220 comprises, as shown in FIG. 6, a cylinder 225 including a thin cylindrical external cylinder 221, a thin cylindrical internal cylinder 222 inserted from the other end (upper part in FIG. 6) to the one end (lower part in FIG. 6) in the centerline direction (vertical direction in FIG. 6) of the cylindrical external cylinder 221, a bottom cover 223 that covers the one end (lower part in FIG. 6) in the centerline direction of the external cylinder 221, and a top cover 224 that covers the other end (upper part in FIG. 6) in the centerline direction of the internal cylinder 222. The internal cylinder 222 is inserted in a slidable manner relative to the external cylinder 221.

Moreover, the front wheel side damper 220 comprises a piston rod 227 mounted on the bottom cover 223 so as to extend in the centerline direction. The piston rod 227 includes a cylindrical part 227a of a cylindrical shape extending in the centerline direction, and a disk-shaped flange part 227b provided to the other end (upper part in FIG. 6) in the centerline direction of the cylindrical part 227a.

Moreover, the front wheel side damper 220 comprises a piston 226 that is fixed to one end side (lower part side in FIG. 6) in the centerline direction of the internal cylinder 222, and slidable relative to the outer periphery of the cylindrical part 227a of the piston rod 227. The piston 226 comes into contact with the outer peripheral surface of the cylindrical part 227a of the piston rod 227, and partitions the space where the liquid (oil in this embodiment) in the cylinder 225 is enclosed into a first oil chamber 231 on one end side that is more toward the centerline direction than the piston 226, and a second oil chamber 232 on the other end side that is more toward the centerline direction than the piston 226. In this embodiment, oil functions as an example of the hydraulic oil.

Moreover, the front wheel side damper 220 comprises a cover member 230 that is provided above the piston rod 227 and covers the opening of the cylindrical part 227*a* of the piston rod 227. The cover member 230 supports one end (lower part in FIG. 6) in the centerline direction of the front wheel side suspension spring 210. The front wheel side damper 220 includes an oil reservoir chamber 233 formed in the space on the other end side that is more in the centerline direction than the cover member 230 in the internal cylinder 222 and in the internal space of the cylindrical part 227*a* of the piston rod 227. The oil reservoir chamber 233 is constantly in communication with the first oil chamber 231 and the second oil chamber 232.

Moreover, the front wheel side damper 220 comprises a first damping force generation unit 228 provided to the piston 226, and a second damping force generation unit 229 formed on the piston rod 227. The first damping force generation unit 228 and the second damping force generation unit 229 dampen the stretching vibration of the internal cylinder 222 and the piston rod 227 associated with the absorption of the impact force from the road surface by the front wheel side suspension spring 210. The first damping force generation unit 228 is disposed so as to function as a communicating path between the first oil chamber 231 and the second oil chamber 232, and the second damping force generation unit 229 is formed so as to function as a communicating path between the first oil chamber 231, the second oil chamber 232 and the oil reservoir chamber 233.

The front wheel side liquid supplying device 260 is a device for supplying liquid into the jack chamber 242 (described later) of the front wheel side relative position changing device 240 via a pumping operation based on the telescopic motion of the piston rod 227 relative to the internal cylinder 222.

The front wheel side liquid supplying device 260 includes a cylindrical pipe 261 that is fixed to the cover member 230 of the front wheel side damper 220 in a manner of extending in the centerline direction. The pipe 261 is coaxially inserted into the pump chamber 262, which is the inside of the lower cylindrical part 241*a* of the supporting member 241 of the front wheel side relative position changing device 240 described later.

Moreover, the front wheel side liquid supplying device 260 includes a discharge check valve 263 for discharging, toward the jack chamber 242 described later, the liquid in the pump chamber 262 that is pressurized by the movement of the piston rod 227 in the direction of entering the internal cylinder 222, and a suction check valve 264 for sucking the liquid in the oil reservoir chamber 233 into the pump chamber 262 which becomes a negative pressure by the movement of the piston rod 227 in the direction of exiting from the internal cylinder 222.

FIG. 7A and FIG. 7B are diagrams explaining the operation of the front wheel side liquid supplying device 260.

When the motorcycle 1 is driven and the front fork 13 receives force from a bumpy road surface, the front wheel side liquid supplying device 260 configured as described above performs a pumping operation based on a telescopic motion where the piston rod 227 enters and exits the internal cylinder 222 and the pipe 261 enters and exits the supporting member 241 of the front wheel side relative position changing device 240. When the pump chamber 262 is pressurized by this pumping operation, the liquid in the pump chamber 262 opens the discharge check valve 263 and is discharged toward the jack chamber 242 of the front wheel side relative position changing device 240 (refer to FIG. 7A), and when the pump chamber 262 becomes a negative pressure, the liquid in the oil reservoir chamber 233 opens the suction check valve 264 and gets sucked into the pump chamber 262 (refer to FIG. 7B).

The front wheel side relative position changing device 240 comprises a supporting member 241 that is disposed inside the internal cylinder 222 of the front wheel side damper 220, and supports the other end (upper part in FIG. 7A and FIG. 7B) in the centerline direction of the front wheel side suspension spring 210 via the disk-shaped spring bearing 244. The supporting member 241 includes a lower cylindrical part 241*a* formed in a cylindrical shape on one end side (lower side in FIG. 7A and FIG. 7B) in the centerline direction, and an upper cylindrical part 241*b* formed in a cylindrical shape on the other end side (upper side in FIG. 7A and FIG. 7B) in the centerline direction. A pipe 261 is inserted into the lower cylindrical part 241*a*.

Moreover, the front wheel side relative position changing device 240 includes a hydraulic jack 243 that is fitted into the upper cylindrical part 241*b* of the supporting member 241 and forms the jack chamber 242 together with the supporting member 241. When the liquid in the cylinder 225 is filled in the jack chamber 242 or the liquid is discharged from inside the jack chamber 242, the supporting member 241 moves in the centerline direction relative to the hydraulic jack 243. A head tube-side mounting part (not shown) is mounted on the upper part of the hydraulic jack 243, the spring force of the front wheel side suspension spring 210 changes when the supporting member 241 moves in the centerline direction relative to the hydraulic jack 243 and, consequently, the relative position of the seat 19 relative to the front wheel 14 also changes.

Moreover, the front wheel side relative position changing device 240 includes a front wheel side solenoid valve 270 as a solenoid valve that is provided on a fluid distribution channel between the jack chamber 242 and the oil reservoir chamber 233, and which is opened to accumulate, in the jack chamber 242, the liquid that was supplied to the jack chamber 242, and closed to discharge, to the oil reservoir chamber 233, the liquid that was supplied to the jack chamber 242. The front wheel side solenoid valve 270 will be described in detail later.

FIG. 8A and FIG. 8B are diagrams explaining the vehicle height adjustment performed by the front wheel side relative position changing device 240.

When liquid is supplied into the jack chamber 242 by the front wheel side liquid supplying device 260 in a state where the front wheel side solenoid valve 270 is even slightly closed from its fully open state, the liquid is filled in the jack chamber 242, the supporting member 241 moves to one end side (lower side in FIG. 8A) in the centerline direction relative to the hydraulic jack 243, and the spring length of the front wheel side suspension spring 210 becomes shorter (refer to FIG. 8A). Meanwhile, when the front wheel side solenoid valve 270 is opened fully, the liquid in the jack chamber 242 is discharged to the oil reservoir chamber 233, the supporting member 241 moves to the other end side (upper side in FIG. 8B) in the centerline direction relative to the hydraulic jack 243, and the spring length of the front wheel side suspension spring 210 becomes longer (refer to FIG. 8B).

When the spring length of the front wheel side suspension spring 210 becomes shorter as a result of the supporting member 241 moving relative to the hydraulic jack 243, the spring force of the front wheel side suspension spring 210 pressing the supporting member 241 becomes greater in comparison to the time before the supporting member 241 moved relative to the hydraulic jack 243. Consequently, even when force works from the vehicle body frame 11 toward the front wheel 14, the initial load that does not change the relative position of the two is switched. In the foregoing case, when the same force works from the vehicle body frame 11 (seat 19) to the one end side (lower side in FIG. 8A and FIG. 8B) in the centerline direction, the subduction level (change in the distance between the head tube-side mounting part (not shown) and the axle side mounting part 285) of the front fork 13 will decrease. Thus, when the spring length of the front wheel side suspension spring 210 becomes shorter as a result of the supporting member 241 moving relative to the hydraulic jack 243, the height of the seat 19 will increase (vehicle height will increase) in comparison to the time before the supporting member 241 moved relative to the hydraulic jack 243. In other words, the vehicle height increases by reducing the opening of the front wheel side solenoid valve 270.

Meanwhile, when the spring length of the front wheel side suspension spring 210 becomes longer as a result of the supporting member 241 moving relative to the hydraulic jack 243, the spring force of the front wheel side suspension spring 210 pressing the supporting member 241 becomes smaller in comparison to the time before the supporting member 241 moved relative to the hydraulic jack 243. In the foregoing case, when the same force works from the vehicle body frame 11 (seat 19) to the one end side (lower side in FIG. 8A and FIG. 8B) in the centerline direction, the subduction level (change in the distance between the head tube-side mounting part (not shown) and the axle side mounting part 285) of the front fork 13 will increase. Thus, when the spring length of the front wheel side suspension spring 210 becomes longer as a result of the supporting member 241 moving relative to the hydraulic jack 243, the height of the seat 19 will decrease (vehicle height will decrease) in comparison to the time before the supporting member 241 moved relative to the hydraulic jack 243. In other words, the vehicle height decreases by increasing the opening of the front wheel side solenoid valve 270.

Note that the opening of the front wheel side solenoid valve 270 is controlled by the control device 50.

Moreover, when the front wheel side solenoid valve 270 is opened, the destination of discharging the liquid supplied to the jack chamber 242 may also be the first oil chamber 231 and/or the second oil chamber 232.

Figure 9:
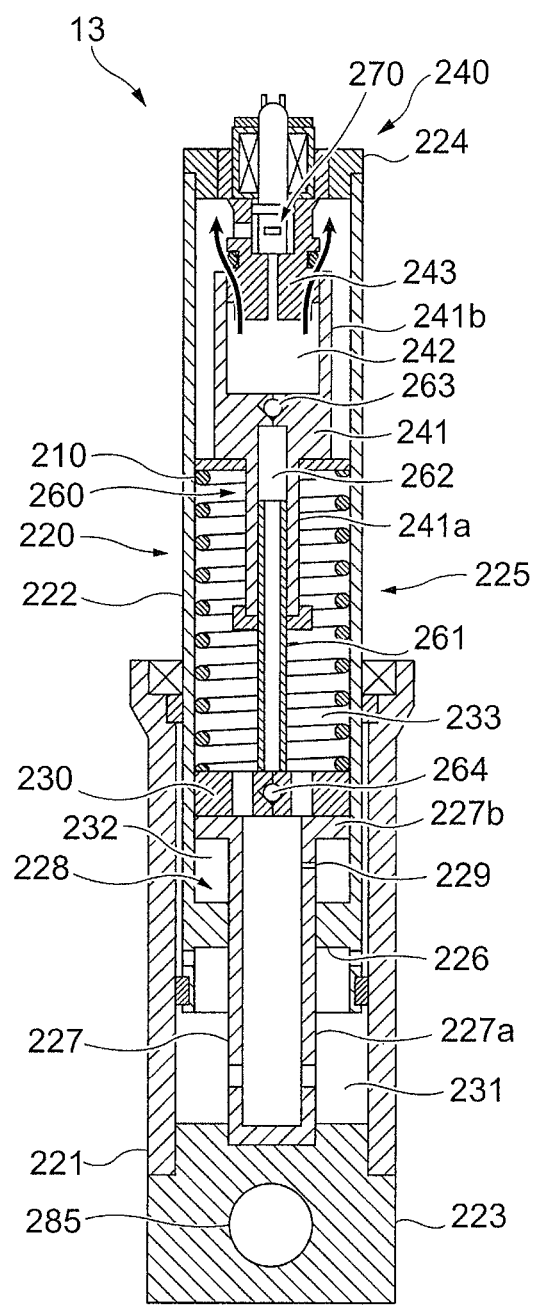
FIG. 9 is a diagram showing the mechanism for maintaining the vehicle height.

FIG. 9 is a diagram showing the mechanism for maintaining the vehicle height.

As shown in FIG. 9, formed on the outer peripheral surface of the hydraulic jack 243 is a return path (not shown) for returning the liquid in the jack chamber 242 into the oil reservoir chamber 233 when the supporting member 241 moves up to a predetermined limit position on the one end side (lower side in FIG. 8A and FIG. 8B) in the centerline direction relative to the hydraulic jack 243.

Even when the liquid is continuously supplied into the jack chamber 242 via the return path when the front wheel side solenoid valve 270 is fully open, since the supplied liquid is returned into the oil reservoir chamber 233, the position of the supporting member 241 relative to the hydraulic jack 243, and by extension the height of the seat 19 (vehicle height), is maintained.

Note that, in the ensuing explanation, the state of the front fork 13 when the front wheel side solenoid valve 270 is fully open and the moving distance of the supporting member 241 relative to the hydraulic jack 243 is minimum (zero) is referred to as the "minimum state," and the state of the front fork 13 when the front wheel side solenoid valve 270 is fully closed and the moving distance of the supporting member 241 relative to the hydraulic jack 243 is maximum is referred to as the "maximum state."

Moreover, the front fork 13 includes a front wheel side relative position detection unit 295 (refer to FIG. 11). As the front wheel side relative position detection unit 295, exemplified may be a unit capable of detecting the moving distance of the supporting member 241 in the centerline direction relative to the hydraulic jack 243; that is, the moving distance of the supporting member 241 in the centerline direction relative to the head tube-side mounting part. Specifically, exemplified may be case of winding a coil around a position corresponding to the outer peripheral surface of the internal cylinder 222 at the position in a radial direction and corresponding to the supporting member 241 at the position in the centerline direction and configuring the supporting member 241 from a magnetic body, and using a unit capable of detecting the moving distance of the supporting member 241 on the basis of the impedance of the coil that changes according to the movement of the supporting member 241 in the centerline direction relative to the hydraulic jack 243.

The schematic configuration of the front wheel side solenoid valve 270 of the front wheel side relative position changing device 240 and the rear wheel side solenoid valve 170 of the rear wheel side relative position changing device 140 is now explained.

Figure 10:
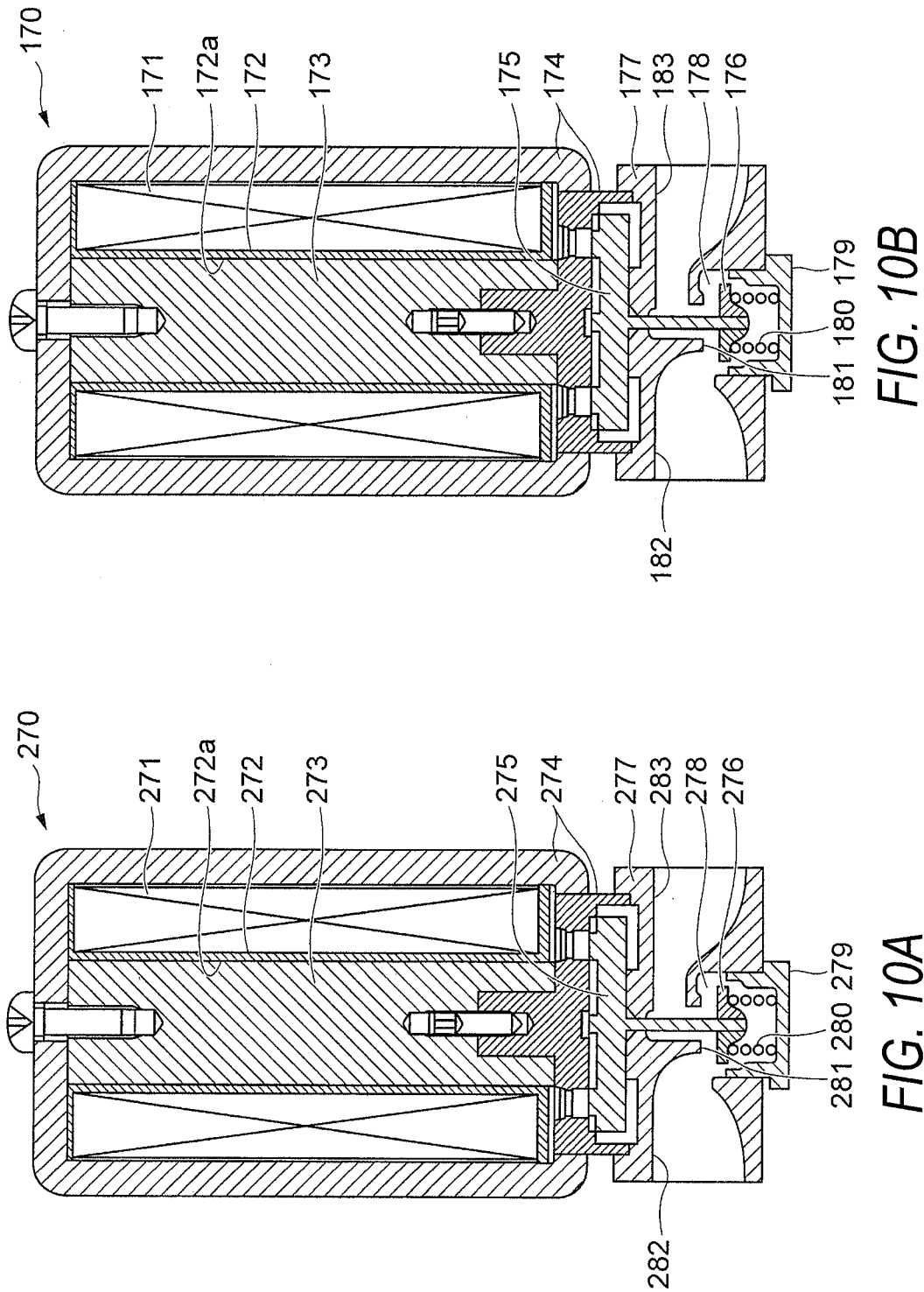
FIG. 10A is a diagram showing a schematic configuration of the front wheel side solenoid valve.
FIG. 10B is a diagram showing a schematic configuration of the rear wheel side solenoid valve.

FIG. 10A is a diagram showing a schematic configuration of the front wheel side solenoid valve 270, and FIG. 10B is a diagram showing a schematic configuration of the rear wheel side solenoid valve 170.

The front wheel side solenoid valve 270 is a so-called normally-open type solenoid valve and comprises, as shown in FIG. 10A, a bobbin 272 wound with a coil 271, a bar-shaped fixed core 273 fixed to a hollow part 272a of the bobbin 272, a holder 274 for supporting the coil 271 and the bobbin 272 and the fixed core 273, and a substantially disk-shaped moving core 275 that is disposed in correspondence with a front edge (end face) of the fixed core 273 and sucked by the fixed core 273. Moreover, the front wheel side solenoid valve 270 comprises a valve element 276 fixed to the front edge center of the moving core 275, a body 277 that is combined with the holder 274, a valve chamber 278 that is formed on the body 277 and on which a valve element 276 is disposed, a cover member 279 that covers the opening formed on the body 277 and forms the valve chamber 278 in coordination with the body 277, and a coil spring 280 disposed between the valve element 276 and the cover member 279. Moreover, the front wheel side solenoid valve 270 comprises a valve seat 281 that is formed on the body 277 and disposed in the valve chamber 278 in correspondence with the valve element 276, an introduction passage 282 that is formed on the body 277 and introduces a fluid from the jack chamber 242 (refer to FIG. 9) to the valve chamber 278, and a derivation passage 283 that is formed on the body 277 and derives the fluid from the valve chamber 278 toward the oil reservoir chamber 233 via the valve seat 281. Note that the front wheel side solenoid valve 270 may also be a normally-closed type solenoid valve.

The rear wheel side solenoid valve 170 is a so-called normally-open type solenoid valve and comprises, as shown in FIG. 10B, a bobbin 172 wound with a coil 171, a bar-shaped fixed core 173 fixed to a hollow part 172a of the bobbin 172, a holder 174 for supporting the coil 171 and the bobbin 172 and the fixed core 173, and a substantially disk-shaped moving core 175 that is disposed in correspondence with a front edge (end face) of the fixed core 173 and sucked by the fixed core 173. Moreover, the rear wheel side solenoid valve 170 comprises a valve element 176 fixed to the front edge center of the moving core 175, a body 177 that is combined with the holder 174, a valve chamber 178 that is formed on the body 177 and on which a valve element 176 is disposed, a cover member 179 that covers the opening formed on the body 177 and forms the valve chamber 178 in coordination with the body 177, and a coil spring 180 disposed between the valve element 176 and the cover member 179. Moreover, the rear wheel side solenoid valve 170 comprises a valve seat 181 that is formed on the body 177 and disposed in the valve chamber 178 in correspondence with the valve element 176, an introduction passage 182 that is formed on the body 177 and introduces a fluid from the jack chamber 142 (refer to FIG. 5) to the valve chamber 178, and a derivation passage 183 that is formed on the body 177 and derives the fluid from the valve chamber 178 toward the liquid retaining chamber 143a via the valve seat 181. Note that the rear wheel side solenoid valve 170 may also be a normally-closed type solenoid valve.

With the front wheel side solenoid valve 270 and the rear wheel side solenoid valve 170 configured as described above, during a non-conductive state where the coils 271, 171 are not conducting, the valve elements 276, 176 fixed to the front edge (end face) of the moving cores 275, 175 do not come into contact with the valve seats 281, 181 since the moving cores 275, 175 are biased downward in the diagram by the coil springs 280, 180. Thus, the introduction passages 282, 182 and the derivation passages 283, 183 are in communication, and the front wheel side solenoid valve 270 and the rear wheel side solenoid valve 170 are in an open state. Meanwhile, with the front wheel side solenoid valve 270 and the rear wheel side solenoid valve 170, during a conductive state where the coils 271, 171 are conducting, the moving cores 275, 175 become displaced due to the balance of the suction force of the fixed cores 273, 173 and the biasing force of the coil springs 280, 180 when the coils 271, 171 are excited by conduction. The front wheel side solenoid valve 270 and the rear wheel side solenoid valve 170 are configured such that the position of the valve elements 276, 176 relative to the valve seats 281, 181; that is, the opening of the valve, is adjusted. The opening of the valve is adjusted by changing the power (current, voltage) that is supplied to the coils 271, 171.

<First Embodiment>

The control device 50 is now explained. The first embodiment of the control device 50 is foremost explained.

FIG. 11 is a block diagram of the control device 50. The control device 50 comprises a CPU, a ROM storing programs to be executed by the CPU and various types of data, a RAM that is used as a work memory of the CPU, and an EEPROM which is a nonvolatile memory. Input to the control device 50 are the output signals from the foregoing front wheel rotation detection sensor 31, rear wheel rotation detection sensor 32, front wheel side relative position detection unit 295 and rear wheel side relative position detection unit 195.

The control device 50 comprises a front wheel rotating speed calculation unit 51 for calculating the rotating speed of the front wheel 14 on the basis of the output signal from the front wheel rotation detection sensor 31, and a rear wheel rotating speed calculation unit 52 for calculating the rotating speed of the rear wheel 21 on the basis of the output signal from the rear wheel rotation detection sensor 32. The front wheel rotating speed calculation unit 51 and the rear wheel rotating speed calculation unit 52 respectively ascertain the rotation angle on the basis of the pulse signal as the output signal from the sensor, and differentiate the rotation angle with the elapsed time to calculate the rotating speed.

The control device 50 comprises a front wheel side moving distance ascertaining unit 53 for ascertaining a front wheel side moving distance Lf, which is a moving distance of the supporting member 241 of the front wheel side relative position changing device 240 (refer to FIG. 8A and FIG. 8B) relative to the hydraulic jack 243, on the basis of the output signal from the front wheel side relative position detection unit 295. Moreover, the control device 50 comprises a rear wheel side moving distance ascertaining unit 54 for ascertaining a rear wheel side moving distance Lr, which is a moving distance of the supporting member 141 of the rear wheel side relative position changing device 140 relative to the hydraulic jack 143, on the basis of the output signal from the rear wheel side relative position detection unit 195. The front wheel side moving distance ascertaining unit 53 and the rear wheel side moving distance ascertaining unit 54 can respectively ascertain the front wheel side moving distance Lf and the rear wheel side moving distance Lr on the basis of the correlation between the impedance of the coil and the front wheel side moving distance Lf or the rear wheel side moving distance Lr that is stored in advance, for example, in the ROM.

Moreover, the control device 50 comprises a vehicle speed ascertaining unit 56 for ascertaining a vehicle speed Vc, which is a moving velocity of the motorcycle 1, on the basis of the rotating speed of the front wheel 14 calculated by the front wheel rotating speed calculation unit 51 and/or the rotating speed of the rear wheel 21 calculated by the rear wheel rotating speed calculation unit 52. The vehicle speed ascertaining unit 56 ascertains the vehicle speed Vc by using the front wheel rotating speed Rf or the rear wheel rotating speed Rr and calculating the moving velocity of the front wheel 14 or the rear wheel 21. The moving velocity of the front wheel 14 can be calculated by using the front wheel rotating speed Rf and the outer diameter of the tire of the front wheel 14, and the moving velocity of the rear wheel 21 can be calculated by using the rear wheel rotating speed Rr and the outer diameter of the tire of the rear wheel 21. In addition, when the motorcycle 1 is running in a normal state, the vehicle speed Vc can be understood as being equal to the moving velocity of the front wheel 14 and/or the moving velocity of the rear wheel 21. Moreover, the vehicle speed ascertaining unit 56 may also ascertain the vehicle speed Vc by using the average value of the front wheel rotating speed Rf and the rear wheel rotating speed Rr and calculating the average moving velocity of the front wheel 14 and the rear wheel 21.

Moreover, the control device 50 includes a solenoid valve control unit 57 for controlling the opening of the front wheel side solenoid valve 270 of the front wheel side relative position changing device 240 and the opening of the rear wheel side solenoid valve 170 of the rear wheel side relative position changing device 140 on the basis of the vehicle speed Vc ascertained by the vehicle speed ascertaining unit 56. The solenoid valve control unit 57 will be described in detail later.

The solenoid valve control unit 57 of the control device 50 is now explained in detail.

Figure 12:
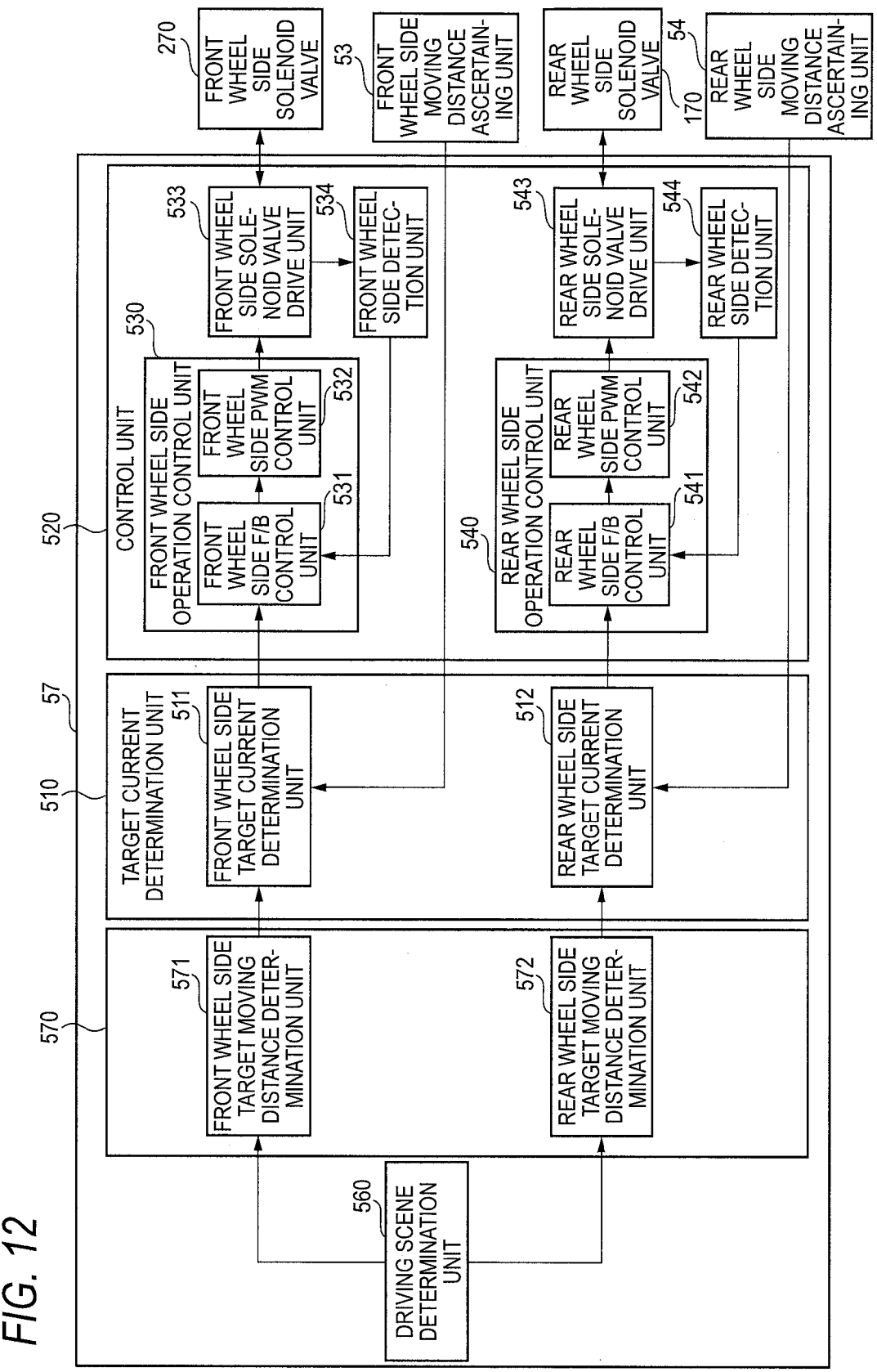
FIG. 12 is a block diagram of the solenoid valve control unit according to this embodiment.

FIG. 12 is a block diagram of the solenoid valve control unit 57 according to this embodiment.

The solenoid valve control unit 57 includes a driving scene determination unit 560 for determining the driving scene of the motorcycle 1 on the basis of driving information for determining the driving scene of the motorcycle 1. Moreover, the solenoid valve control unit 57 comprises target moving distance determination unit 570 that includes a front wheel side target moving distance determination unit 571 for determining the front wheel side target moving distance, which is the target moving distance of the front wheel side moving distance Lf, and a rear wheel side target moving distance determination unit 572 for determining the rear wheel side target moving distance, which is the target moving distance of the rear wheel side moving distance Lr. In addition, the solenoid valve control unit 57 includes a target current determination unit 510 for determining the target current to be supplied to the front wheel side solenoid valve 270 of the front wheel side relative position changing device 240 and the rear wheel side solenoid valve 170 of the rear wheel side relative position changing device 140, and a control unit 520 for performing feedback control and the like on the basis of the target current that was determined by the target current determination unit 510.

The driving scene determination unit 560 determines the driving scene of the motorcycle 1 on the basis of the vehicle speed Vc ascertained by the vehicle speed ascertaining unit 56 (refer to FIG. 11) and the angle of inclination Bc of the motorcycle 1 in the horizontal direction detected by the angle of inclination sensor 33. In other words, the vehicle speed Vc and the angle of inclination Bc are used as the driving information. Here, a driving scene refers to, for example, the location where the motorcycle 1 is being driven, or the driving status of the motorcycle 1.

Figure 13:
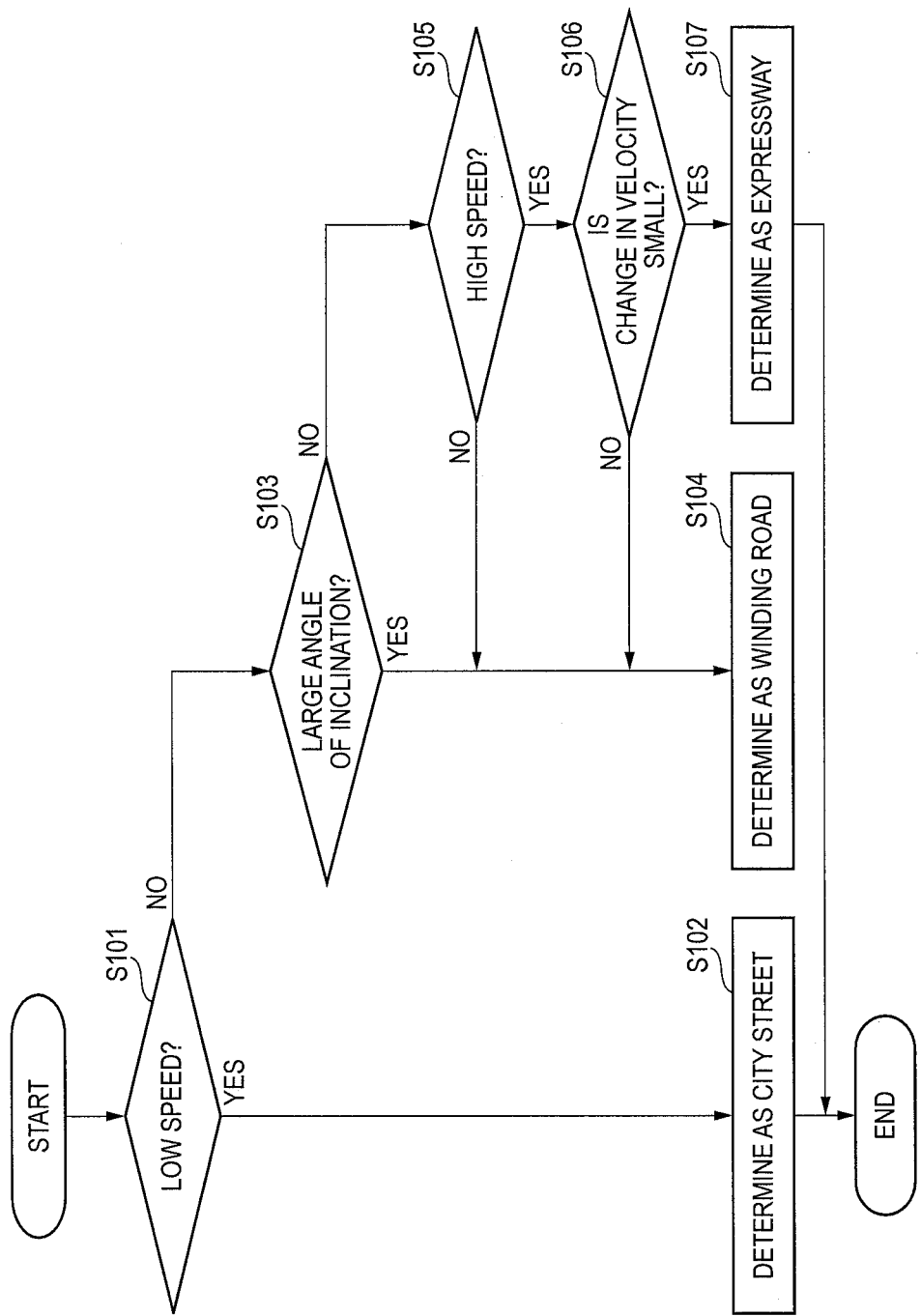
FIG. 13 is a flowchart explaining the routine performed by the driving scene determination unit for determining the driving scene of the motorcycle on the basis of the vehicle speed and the angle of inclination.

FIG. 13 is a flowchart explaining the routine performed by the driving scene determination unit 560 for determining the driving scene of the motorcycle 1 on the basis of the vehicle speed Vc and the angle of inclination Bc.

Here, exemplified is a case where the driving scene determination unit 560 determines the driving scene of the motorcycle 1 as three types of scenes; namely, "city street", "winding road", and "expressway".

Foremost, the driving scene determination unit 560 refers to the vehicle speed Vc, and determines whether the vehicle speed Vc is a "low speed" (step 101). When the vehicle speed Vc is a low speed (step 101: Yes), the driving scene determination unit 560 determines that the driving scene of the motorcycle 1 is a "city street" (step 102).

Meanwhile, when the vehicle speed Vc is not a low speed (step 102: No), the driving scene determination unit 560 refers to the angle of inclination Bc, and determines whether the angle of inclination Bc sometimes exceeds a predetermined range (step 103). When the angle of inclination Be sometimes exceeds a predetermined range (step 103: Yes), the driving scene determination unit 560 determines that the driving scene of the motorcycle 1 is a "winding road" (step 104).

Meanwhile, when the angle of inclination Bc does not even once exceed a predetermined range (step 103: No), the driving scene determination unit 560 refers to the vehicle speed Vc and determines whether the vehicle speed Vc is a "high speed" (step 105). When the vehicle speed Vc is not a "high speed"; that is, when the vehicle speed Ve is a "medium speed" between the "low speed" and the "high speed" (step 105: No), the driving scene determination unit 560 determines that the driving scene of the motorcycle 1 is a "winding road" (step 104).

Meanwhile, when the vehicle speed Vc is a "high speed" (step 105: Yes), the driving scene determination unit 560 refers to the vehicle speed Vc, and determines whether the change in the vehicle speed Vc is small (step 106). Whether the change in the vehicle speed Ve is small can be determined based on whether the change in the vehicle speed Ye falls within a predetermined range. When the change in the vehicle speed Vc is small (step 106: Yes), the driving scene determination unit 560 determines that the driving scene of the motorcycle 1 is an "expressway" (step 107).

Meanwhile, when the change in the vehicle speed Vc is not small (step 106: No), the driving scene determination unit 560 determines that the driving scene of the motorcycle 1 is a "winding road" (step 104).

In the foregoing explanation, whether the vehicle speed Vc is a "low speed", a "medium speed", or a "high speed" is determined by predetermining the velocity regions of "low speed", "medium speed", and "high speed", and determining which velocity region the vehicle speed Vc falls under. This determination may be made on the basis of the average velocity of the vehicle speed Vc during a predetermined time, or on the basis of which velocity region the vehicle speed Vc falls under the most during the predetermined time.

In the case explained with reference to FIG. 13, in step 101, the driving scene determination unit 560 determines whether the driving scene of the motorcycle 1 is a "city street", or otherwise based on whether the vehicle speed Vc is a "low speed". In other words, when the driving scene of the motorcycle 1 is a "winding road" or an "expressway", since the velocity region of the vehicle speed Vc will normally be a "medium speed" or a "high speed", it is possible to determine whether the driving scene of the motorcycle 1 is a "city street", or otherwise.

Moreover, in step 103, the driving scene determination unit 560 determines whether the driving scene of the motorcycle 1 is a "winding road" or an "expressway" on the basis of whether the angle of inclination Be has exceeded a predetermined range. In other words, when the driving scene is a "winding road", there are many curves and, when driving along the curves at a "medium speed" or a "high speed", the motorcycle 1 needs to be driven at a large angle of inclination Be. Thus, when the angle of inclination Bc exceeds a predetermined range, it is possible to determine that the driving scene of the motorcycle 1 is a "winding road". This determination may be made on the basis of the average value of the angle of inclination Bc during a predetermined time, or on the basis of the number of times that the angle of inclination Be exceeded a predetermined range during a predetermined time.

Furthermore, in step 105 and step 106, the driving scene determination unit 560 determines that the driving scene of the motorcycle 1 is an "expressway" when the vehicle speed Vc is a "high speed" and the change in the vehicle speed Vc is small, and otherwise determines that the driving scene of the motorcycle 1 is a "winding road". In other words, when the driving scene is an "expressway", the velocity region of the vehicle speed Vc is normally a "high speed", and generally a constant vehicle speed Vc is maintained. Thus, when these two conditions are satisfied, the driving scene determination unit 560 determines that the driving scene of the motorcycle 1 is an "expressway". Meanwhile, when the driving scene of the motorcycle 1 is a "winding road", the velocity region of the vehicle speed Vc will normally and often be a "medium speed" as a result of driving along curves. Moreover, generally speaking, the vehicle speed Vc is reduced when driving along curves, and the vehicle speed Vc is increased when driving a straight road. Thus, the change in the vehicle speed Vc will increase. Thus, when either of these conditions is satisfied, the driving scene determination unit 560 determines that the driving scene of the motorcycle 1 is a "winding road".

The target moving distance determination unit 570 determines the target moving distance on the basis of the driving scene of the motorcycle 1 that was determined by the driving scene determination unit 560.

FIG. 14 is a table showing the relation between the driving scene of the motorcycle 1 determined by the driving scene determination unit 560 and the vehicle height on the front wheel side and the vehicle height on the rear wheel side.

Here, let it be assumed that the vehicle height on the front wheel side and the vehicle height on the rear wheel side can be set in the three stages of "high" (high position), "medium"

(standard position), and "low" (low position). Moreover, let it be assumed that the corresponding target moving distance can be set in the three stages of "large" (target moving distance is large), "medium" (target moving distance is a medium level), "small" (target moving distance is small or zero). Specifically, when the vehicle height on the front wheel side and the vehicle height on the rear wheel side are "high", then the target moving distance becomes "large". Similarly, when the vehicle height on the front wheel side and the vehicle height on the rear wheel side are "medium", the target moving distance becomes "medium", and when the vehicle height on the front wheel side and the vehicle height on the rear wheel side are "low", the target moving distance becomes "small".

In other words, at the position where the vehicle height on the front wheel side is "high", the front wheel side solenoid valve 270 is closed, and, as explained with reference to FIG. 8A, liquid is supplied from the front wheel side liquid supplying device 260 into the jack chamber 242, the supporting member 241 moves to the one end side in the centerline direction relative to the hydraulic jack 243, and the spring length of the front wheel side suspension spring 210 becomes short. Moreover, at the position where the vehicle height on the rear wheel side is "high", the rear wheel side solenoid valve 170 is closed, and, as explained with reference to FIG. 4A, liquid is supplied from the rear wheel side liquid supplying device 160 into the jack chamber 142, the supporting member 141 moves to the one end side in the centerline direction relative to the hydraulic jack 143, and the spring length of the rear wheel side suspension spring 110 becomes short. Consequently, even when the user mounts the seat 19, the subduction level of the front fork 13 and the rear suspension 22 will decrease, and the vehicle height will increase. This is the movement when the target moving distance is "large".

Meanwhile, at the position where the vehicle height on the front wheel side is "low", as explained with reference to FIG. 8B, the front wheel side solenoid valve 270 is fully opened, the liquid in the jack chamber 242 is discharged to the oil reservoir chamber 233, the supporting member 241 moves to the other end side in the centerline direction relative to the hydraulic jack 243, and the spring length of the front wheel side suspension spring 210 becomes long. Moreover, at the position where the vehicle height on the rear wheel side is "low", as explained with reference to FIG. 4B, the rear wheel side solenoid valve 170 is fully opened, the liquid in the jack chamber 142 is discharged to the liquid retaining chamber 143a, the supporting member 141 moves to the other end side in the centerline direction relative to the hydraulic jack 143, and the spring length of the rear wheel side suspension spring 110 becomes long. Consequently, when the user mounts the seat 19, the subduction level of the front fork 13 and the rear suspension 22 will increase, and the vehicle height will decrease. This is the movement when the target moving distance is "small".

In addition, at the position where the vehicle height on the front wheel side is "medium", by adjusting the opening of the front wheel side solenoid valve 270, the vehicle height on the front wheel side can be made to be a "medium" state between "low" and "high". Similarly, at the position where the vehicle height on the rear wheel side is "medium", by adjusting the opening of the rear wheel side solenoid valve 170, the vehicle height on the rear wheel side can be made to be a "medium" state between "low" and "high". This is the movement when the target moving distance is "medium".

When the illustrated driving scene is a "city street", both the vehicle height on the front wheel side and the vehicle height on the rear wheel side become "medium". Otherwise, both the vehicle height on the front wheel side and the vehicle height on the rear wheel side may be set to "low". Consequently, since the spring length of the front wheel side suspension spring 210 and the rear wheel side suspension spring 110 will become relatively long, it becomes easier for the front wheel side suspension spring 210 and the rear wheel side suspension spring 110 to function, and offer a light ride quality.

Moreover, when the driving scene is a "winding road", the vehicle height on the front wheel side is set to "medium" and the vehicle height on the rear wheel side is set to "high". Consequently, the center of gravity of the motorcycle 1 is raised, and the motion of the motorcycle 1 becomes quick. In addition, the caster angle of the front fork 13 is reduced, and the turning performance of the motorcycle 1 is improved.

In addition, when the driving scene is an "expressway", the vehicle height on the front wheel side is set to "high", and the vehicle height on the rear wheel side is set to "medium". Consequently, the caster angle of the front fork 13 is increased, and the straight-running stability of the motorcycle 1 is improved.

Note that, when the motorcycle 1 is stopped, the vehicle height is preferably lowered for facilitating the process of mounting and dismounting a motorcycle (both the vehicle height on the front wheel side and the vehicle height on the rear wheel side are set to "low"), and the adjustment of the vehicle height explained with reference to FIG. 14 is preferably performed after the user starts riding the motorcycle 1.

Figure 15A:
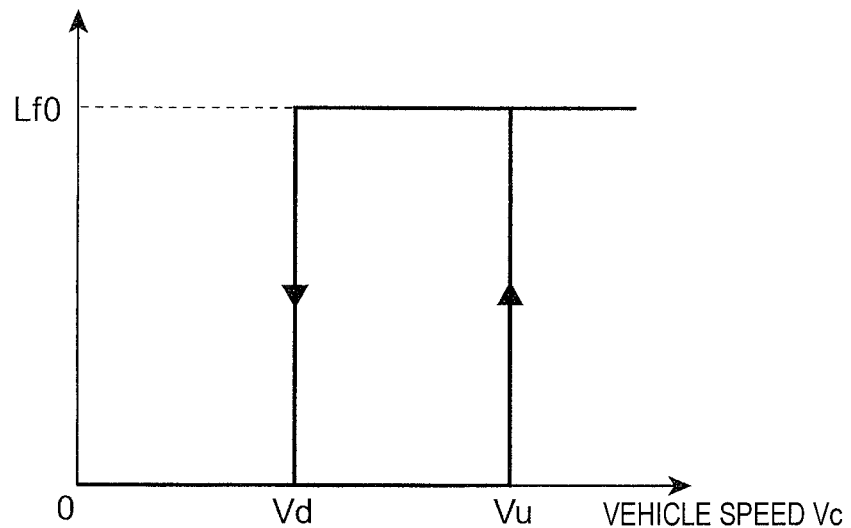
FIG. 15A is a diagram showing the correlation between the vehicle speed and the front wheel side target moving distance.
Figure 15B:
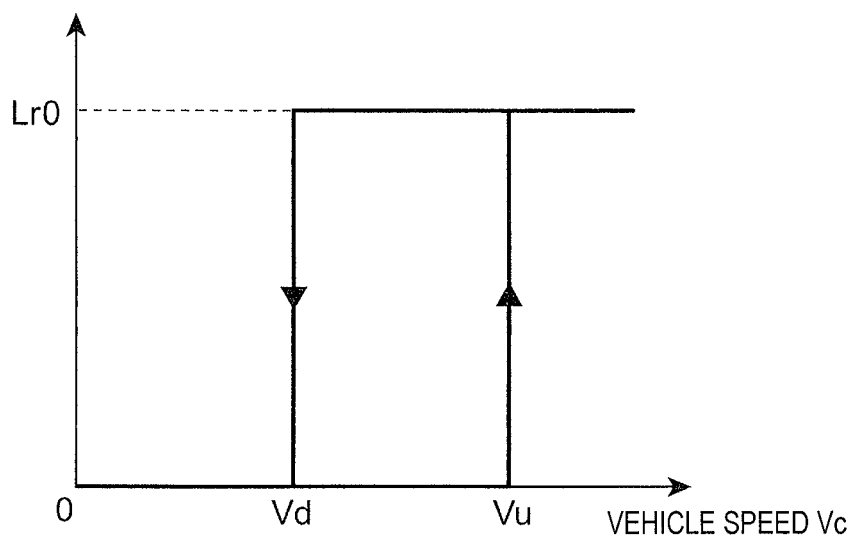
FIG. 15B is a diagram showing the correlation between the vehicle speed and the rear wheel side target moving distance.

FIG. 15A is a diagram showing the correlation between the vehicle speed Vc and the front wheel side target moving distance. FIG. 15B is a diagram showing the correlation between the vehicle speed Vc and the rear wheel side target moving distance.

After the user starts riding the motorcycle 1, the target moving distance determination unit 570 determines the target moving distance is zero when the vehicle speed Vc ascertained by the vehicle speed ascertaining unit 56 to be smaller than the predetermined climbing vehicle speed Vu, and determines the target moving distance to be a predetermined value according to the driving scene of the motorcycle 1 when the vehicle speed Vc changes from a state of being smaller than the climbing vehicle speed Vu to a speed that is equal to or greater than the climbing vehicle speed Vu. More specifically, when the vehicle speed Vc changes from a state of being smaller than the climbing vehicle speed Vu to a speed that is equal to or greater than the climbing vehicle speed Vu as shown in FIG. 15A, the front wheel side target moving distance determination unit 571 determines the front wheel side target moving distance to be a predetermined front wheel side target moving distance Lf0 that is predetermined according to the driving scene of the motorcycle 1. Meanwhile, when the vehicle speed Vc changes from a state of being smaller than the climbing vehicle speed Vu to a speed that is equal to or greater than the climbing vehicle speed Vu as shown in FIG. 15B, the rear wheel side target moving distance determination unit 572 determines the rear wheel side target moving distance to be a predetermined rear wheel side target moving distance Lr0 that is predetermined according to the driving scene of the motorcycle 1. Subsequently, while the vehicle speed Vc ascertained by the vehicle speed ascertaining unit 56 is a speed that is equal to or greater than the climbing vehicle speed Vu, the front wheel side target moving distance determination unit 571 and the rear wheel side target moving distance determination unit 572 determine the front wheel side target moving distance and the rear wheel side target moving distance to the predetermined front wheel side target moving distance Lf0 and the predetermined rear wheel side target moving distance Lr0. The relation of the driving scene of the motorcycle 1 and the corresponding predetermined front wheel side target moving distance Lf0 and predetermined rear wheel side target moving distance Lr0 is stored in advance in the ROM. Since the vehicle height of the motorcycle 1 is defined according to the front wheel side moving distance Lf and the rear wheel side moving distance Lr, exemplified may be determining the target vehicle height, which is the target value of the vehicle height of the motorcycle 1, according to the driving scene of the motorcycle 1, predetermining the predetermined front wheel side target moving distance Lf0 and the predetermined rear wheel side target moving distance Lr0 according to the target vehicle height, and storing these in the ROM.

Meanwhile, when the motorcycle 1 changes from a state of being driven at a speed that is equal to or greater than the climbing vehicle speed Vu to a state that is equal to or lower than the predetermined lowering vehicle speed Vd, the target moving distance determination unit 570 determines the target moving distance to be zero. In other words, the front wheel side target moving distance determination unit 571 and the rear wheel side target moving distance determination unit 572 determine the front wheel side target moving distance and the rear wheel side target moving distance to be zero. Note that the climbing vehicle speed Vu may be exemplified as 10 km/h, and the lowering vehicle speed Vd may be exemplified as 8 km/h.

Moreover, even when the vehicle speed Vc ascertained by the vehicle speed ascertaining unit 56 is greater than the lowering vehicle speed Vd, the target moving distance determination unit 570 determines the target moving distance to be zero when the motorcycle 1 rapidly decelerates by sudden braking or the like. In other words, the front wheel side target moving distance determination unit 571 and the rear wheel side target moving distance determination unit 572 determine the front wheel side target moving distance and the rear wheel side target moving distance to be zero. Whether the motorcycle 1 rapidly decelerated can be ascertained based on whether the decrement of the vehicle speed Vc ascertained by the vehicle speed ascertaining unit 56 per unit time is equal to or less than a predetermined value.

The target current determination unit 510 includes a front wheel side target current determination unit 511 for determining a front wheel side target current, which is the target current of the front wheel side solenoid valve 270, on the basis of the front wheel side target moving distance determined by the front wheel side target moving distance determination unit 571, and a rear wheel side target current determination unit 512 for determining a rear wheel side target current, which is the target current of the rear wheel side solenoid valve 170, on the basis of the rear wheel side target moving distance determined by the rear wheel side target moving distance determination unit 572.

The front wheel side target current determination unit 511 determines the front wheel side target current, for example, by substituting the front wheel side target moving distance determined by the front wheel side target moving distance determination unit 571 into a map indicating the correspondence of the front wheel side target moving distance and the front wheel side target current which is created in advance on the basis of empirical rules and stored in the ROM.

The rear wheel side target current determination unit 512 determines the rear wheel side target current, for example, by substituting the rear wheel side target moving distance determined by the rear wheel side target moving distance determination unit 572 into a map indicating the correspondence of the rear wheel side target moving distance and the rear wheel side target current which is created in advance on the basis of empirical rules and stored in the ROM.

Note that the front wheel side target current determination unit 511 and the rear wheel side target current determination unit 512 determine the front wheel side target current and the rear wheel side target current to be zero when the front wheel side target moving distance and the rear wheel side target moving distance are zero. Moreover, the front wheel side target current determination unit 511 and the rear wheel side target current determination unit 512 determine the front wheel side target current and the rear wheel side target current to be a predetermined maximum current, for a given period of time, when the front wheel side target moving distance and the rear wheel side target moving distance are zero, and the front wheel side target moving distance and the rear wheel side target moving distance determined by the front wheel side target moving distance determination unit 571 and the rear wheel side target moving distance determination unit 572 are changed to a value other than zero from a state in which the front wheel side target current and the rear wheel side target current have been determined as being zero; that is, when starting the process of increasing the vehicle height from a state in which the vehicle height is not increased. After the lapse of a given period of time, the front wheel side target current determination unit 511 and the rear wheel side target current determination unit 512 determine the front wheel side target current and the rear wheel side target current according to the front wheel side target moving distance and the rear wheel side target moving distance determined by the front wheel side target moving distance determination unit 571 and the rear wheel side target moving distance determination unit 572. Note that, when the front wheel side solenoid valve 270 is a normally-closed type solenoid valve, conduction is required when the front wheel side target moving distance is zero.

Moreover, upon determining the front wheel side target current on the basis of the front wheel side target moving distance determined by the front wheel side target moving distance determination unit 571, after the lapse of a fixed period, the front wheel side target current determination unit 511 performs feedback control on the basis of a deviation between the front wheel side target moving distance determined by the front wheel side target moving distance determination unit 571 and the actual front wheel side moving distance Lf ascertained by the front wheel side moving distance ascertaining unit 53. Similarly, upon determining the rear wheel side target current on the basis of the rear wheel side target moving distance determined by the rear wheel side target moving distance determination unit 572, after the lapse of a fixed period, the rear wheel side target current determination unit 512 performs feedback control on the basis of a deviation between the rear wheel side target moving distance determined by the rear wheel side target moving distance determination unit 572 and the actual rear wheel side moving distance Lr ascertained by the rear wheel side moving distance ascertaining unit 54.

The control unit 520 includes a front wheel side operation control unit 530 for controlling the operation of the front wheel side solenoid valve 270, a front wheel side solenoid valve drive unit 533 for driving the front wheel side solenoid valve 270, and a front wheel side detection unit 534 for detecting the actual current that is actually flowing to the front wheel side solenoid valve 270. Moreover, the control unit 520 includes a rear wheel side operation control unit 540 for controlling the operation of the rear wheel side solenoid valve 170, a rear wheel side solenoid valve drive unit 543 for driving the rear wheel side solenoid valve 170, and a rear wheel side detection unit 544 for detecting the actual current that is actually flowing to the rear wheel side solenoid valve 170.

The front wheel side operation control unit 530 includes a front wheel side feedback (F/B) control unit 531 that performs feedback control on the basis of a deviation between the front wheel side target current determined by the front wheel side target current determination unit 511 and the actual current (front wheel side actual current) detected by the front wheel side detection unit 534, and a front wheel side PWM control unit 532 for performing PWM control to the front wheel side solenoid valve 270.

The rear wheel side operation control unit 540 includes a rear wheel side feedback (FIB) control unit 541 that performs feedback control on the basis of a deviation between the rear wheel side target current determined by the rear wheel side target current determination unit 512 and the actual current (rear wheel side actual current) detected by the rear wheel side detection unit 544, and a rear wheel side PWM control unit 542 for performing PWM control to the rear wheel side solenoid valve 170.

The front wheel side feedback control unit 531 obtains a deviation between the front wheel side target current, and the front wheel side actual current detected by the front wheel side detection unit 534, and performs the feedback processing so that the deviation becomes zero. The rear wheel side feedback control unit 541 obtains a deviation between the rear wheel side target current, and the rear wheel side actual current detected by the rear wheel side detection unit 544, and performs the feedback processing so that the deviation becomes zero. The front wheel side feedback control unit 531 and the rear wheel side feedback control unit 541 may be exemplified, for example, as performing proportional processing with proportional elements and integration processing with integral elements relative to the deviation between the front wheel side target current and the front wheel side actual current and the deviation between the rear wheel side target current and the rear wheel side actual current, and adding the foregoing values with an addition operation unit. Otherwise, the front wheel side feedback control unit 531 and the rear wheel side feedback control unit 541 may be exemplified, for example, as performing proportional processing with proportional elements, integration processing with integral elements and differential processing with differentiating elements relative to the deviation between the target current and the actual current, and adding the foregoing values with an addition operation unit.

The front wheel side PWM control unit 532 changes a duty ratio ($=t/T \times 100(\%)$) of a pulse width (t) of a constant period (T), and performs PWM control to the opening of the front wheel side solenoid valve 270 (voltage that is applied to the coil of the front wheel side solenoid valve 270). When PWM control is performed, the voltage applied to the coil of the front wheel side solenoid valve 270 is applied to the pulse shape according to the duty ratio. Here, the current flowing to the coil 271 of the front wheel side solenoid valve 270 is output without being able to follow the voltage applied to the pulse shape and change due to the impedance of the coil 271, and the current flowing to the coil of the front wheel side solenoid valve 270 increases/decreases in proportion to the duty ratio. The front wheel side PWM control unit 532 can be exemplified, for example, as setting the duty ratio to zero when the front wheel side target current is zero, and setting the duty ratio to 100% when the front wheel side target current is the foregoing maximum current.

Similarly, the rear wheel side PWM control unit 542 changes the duty ratio, and performs PWM control to the opening of the rear wheel side solenoid valve 170 (voltage that is applied to the coil of the rear wheel side solenoid valve 170). When PWM control is performed, the voltage applied to the coil 171 of the rear wheel side solenoid valve 170 is applied to the pulse shape according to the duty ratio, and the current flowing to the coil 171 of the rear wheel side solenoid valve 170 increases/decreases in proportion to the duty ratio. The rear wheel side PWM control unit 542 can be exemplified, for example, as setting the duty ratio to zero when the rear wheel side target current is zero, and setting the duty ratio to 100% when the rear wheel side target current is the foregoing maximum current.

The front wheel side solenoid valve drive unit 533 comprises a transistor (FET) as a switching element connected between a positive side line of a power source and a coil of the front wheel side solenoid valve 270. In addition, by driving a gate of the transistor and causing the transistor to perform a switching operation, the drive of the front wheel side solenoid valve 270 is controlled. The rear wheel side solenoid valve drive unit 543 comprises, for example, a transistor connected between a positive side line of a power source and a coil of the rear wheel side solenoid valve 170. In addition, by driving a gate of the transistor and causing the transistor to perform a switching operation, the drive of the rear wheel side solenoid valve 170 is controlled.

The front wheel side detection unit 534 detects the value of the actual current flowing to the front wheel side solenoid valve 270 from the voltage that is generated at either end of the shunt resistor connected to the front wheel side solenoid valve drive unit 533. The rear wheel side detection unit 544 detects the value of the actual current flowing to the rear wheel side solenoid valve 170 from the voltage that is generated at either end of the shunt resistor connected to the rear wheel side solenoid valve drive unit 543.

As described above, the control unit 520 controls the front fork 13 and the rear suspension 22 that change the relative position of the vehicle body frame 11 and the wheels (front wheel 14, rear wheel 21) of the motorcycle 1, and adjust the vehicle height, which is the height of the vehicle body frame 11, in response to the determined driving scene.

<Second Embodiment>

In the first embodiment, the driving scene determination unit 560 in a sense automatically determined the driving scene of the motorcycle 1 on the basis of the vehicle speed Vc and the angle of inclination Bc, and the target moving distance determination unit 570 determined the target moving distance based thereon, but the present invention is not limited thereto. In other words, the user may also set the driving scene of the motorcycle 1, and the target moving distance determination unit 570 may set the target moving distance based thereon. This is now explained as the second embodiment.

Figure 16:
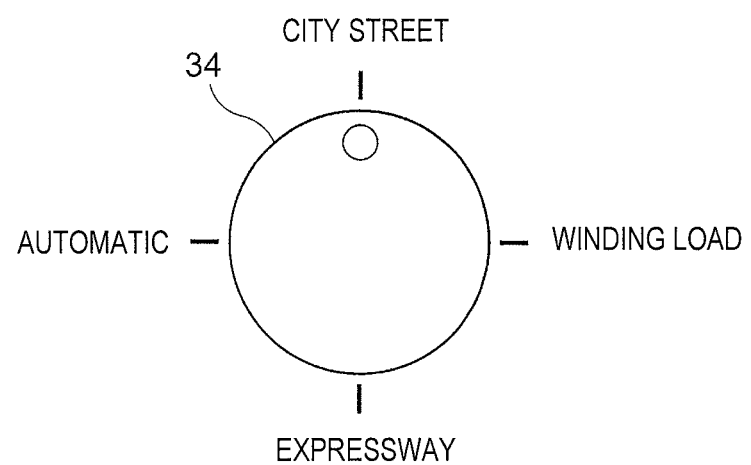
FIG. 16 is an external view of the input device for the use to set the driving scene of the motorcycle.

FIG. 16 is an external view of the input device 34 for the use to set the driving scene of the motorcycle 1.

The input device 34 is, for example, as shown in FIG. 16, a dial-type switch, and is configured so that the user can select among the four options of "automatic", "city street", "winding road", and "expressway" by turning the dial. The input device 34 is provided, for example, near the speedometer.

The selection information regarding which of the four options was selected by the user is sent to the driving scene determination unit 560, and the driving scene determination unit 560 determines the driving scene of the motorcycle 1 according to the selection information.

When the user selects "automatic", as with the first embodiment, the driving scene determination unit 560 performs the processing of determining the driving scene of the motorcycle 1 on the basis of the vehicle speed Vc and the angle of inclination Bc. Meanwhile, when the user selects one among "city street", "winding road", and "expressway", the driving scene determination unit 560 determines that the driving scene of the motorcycle 1 is the selected "city street", "winding road", or "expressway".

Note that, in the solenoid valve control unit 57, the operations of the target moving distance determination unit 570, the target current determination unit 510, and the control unit 520 are the same as the first embodiment.

According to the first embodiment and the second embodiment described above, the determination of the driving scene performed by the driving scene determination unit 560 is repeatedly executed every predetermined period. However, if this period is too short, the vehicle height of the motorcycle 1 may change frequently, and the user may feel uncomfortable or insecure. Thus, this period is preferably set to be a long period to a certain extent. More specifically, the driving scene determination unit 560 may perform the determination of the driving scene, for example, every 10 minutes.

With the motorcycle 1 configured as described above, it is possible to adjust the vehicle height on the side of the front wheel 14 and the vehicle height on the side of the rear wheel 21, respectively, in accordance with the driving scene of the motorcycle 1. Thus, it is possible to improve the operability of the motorcycle 1, and offer a ride quality and comfortableness in accordance with the driving scene.

As explained above, the control device 50 adjusts the vehicle height by determining the driving scene of the motorcycle 1, and controlling the front fork 13 and the rear suspension 22 that change the relative position of the vehicle body frame 11 and the wheels (front wheel 14, rear wheel 21) of the motorcycle 1 in response to the determined driving scene. This control is performed by respectively controlling the front fork 13 and the rear suspension 22 in response to the determined driving scene.

Moreover, this control can also be realized through the coordination of software and hardware resources. Here, the respective functions can be realized by the CPU in a control computer provided to the control device 50 loading into the RAM and executing the programs that realize the respective functions of the control device 50 which are stored in the ROM or the EEPROM.

Thus, the processing performed by the control device 50 can also be deemed a program for causing a computer used in the vehicle height adjusting device to realize the function of determining the driving scene on the basis of the driving information for determining the driving scene of the motorcycle 1, and the function of controlling the front fork 13 and the rear suspension 22 that change the relative position of the vehicle body frame 11 and the wheels (front wheel 14, rear wheel 21) of the motorcycle 1 in response to the determined driving scene.

Note that the program that realizes this embodiment may be provided by being stored in a recording medium such as a CD-ROM in addition to being provided via a communication.

While the foregoing example explained a case where there are three types of driving scenes of the motorcycle 1; namely, "city street", "winding road", and "expressway", but the present invention is not limited thereto. For example, as other driving scenes, considered may be "circuit", "comfort mode" and so on.

When the driving scene of the motorcycle 1 is "circuit", both the vehicle height on the front wheel side and the vehicle height on the rear wheel side are set to "medium". In other words, since the circuit has a stable road surface, both the vehicle height on the front wheel side and the vehicle height on the rear wheel side are preferably standard.

Moreover, in the ease of the "comfort mode", both the vehicle height on the front wheel side and the vehicle height on the rear wheel side are set to "low". Consequently, since the spring length of the front wheel side suspension spring 210 and the rear wheel side suspension spring 110 becomes long, the front wheel side suspension spring 210 and the rear wheel side suspension spring 110 can function easier, it is possible to offer a comfortable ride quality to the user.

Moreover, in the foregoing example, the vehicle speed Vc, which is the moving velocity of the motorcycle 1, and the angle of inclination Bc of the vehicle body frame 11 in the horizontal direction were used as the driving information, and the driving scene was determined based thereon. In addition, the front wheel rotation detection sensor 31, the rear wheel rotation detection sensor 32, and the angle of inclination sensor 33 were used as the sensors for determining the driving scene of the motorcycle 1. Nevertheless, without limitation thereto, for example, also used may be a sensor for detecting the stroke of the front fork 13 and the rear suspension 22, a sensor for detecting the opening of the accelerator, a sensor for detecting the brake pressure of the brake 27, a sensor for detecting the acceleration of the motorcycle 1, and a sensor for detecting the yaw rate of the motorcycle 1.

For example, if the variation in the stroke of the front fork 13 and the rear suspension 22 is great, it can be considered that the driving scene of the motorcycle 1 is a "winding road", and if the variation in the stroke is small, it can be considered that the driving scene is a "city street" or an "expressway". Moreover, when the opening of the accelerator, the brake pressure of the brake 27, the acceleration of the motorcycle 1, or the yaw rate of the motorcycle 1 changes frequently, it can be considered that the driving scene is a "city street" or a "winding road", and if there is no much change, it can be considered that the driving scene is an "expressway".

While the foregoing example illustrated the motorcycle 1 as the vehicle, the present invention is not limited thereto, and may also be applied to other four-wheeled or three-wheeled vehicles.

What is claimed is:

1. A vehicle height adjusting device, comprising:
a changing unit capable of changing a relative position between a vehicle body of a vehicle and wheels of the vehicle; and
a control device that controls the changing unit, said control device including:
a driving scene determination unit that determines a driving scene of the vehicle on the basis of driving information; and
a control unit that controls the relative position in response to the determined driving scene, wherein:
the vehicle height on a front wheel side and the vehicle height on a rear wheel side can be set in three stages of high, medium, and low,
the driving scene is selected from the group consisting of city street, winding road and expressway,
when city street is selected, the vehicle heights on both the front and rear wheel sides are set to be medium,
when winding road is selected, the vehicle height on the front wheel side is set to be medium and the vehicle height on the rear wheel side is set to be high, and
when expressway is selected, the vehicle height on the front wheel side is set to be high and the vehicle height on the rear wheel side is set to be medium.

2. The vehicle height adjusting device according to claim 1, wherein the changing unit includes a front wheel side changing unit changing a front wheel side relative position, which is a relative position between the vehicle body and a front wheel, and a rear wheel side changing unit changing a rear wheel side relative position, which is a relative position between the vehicle body and a rear wheel, and the control unit performs control of changing at least one of the front wheel side relative position and the rear wheel side relative position in response to the determined driving scene.

3. The vehicle height adjusting device according to claim 1, wherein the driving scene determination unit determines the driving scene on the basis of a vehicle speed, which is a moving velocity of the vehicle, and an angle of inclination of the vehicle body in a horizontal direction.

4. The vehicle height adjusting device according to claim 1, wherein the changing unit includes a solenoid valve which is provided in a fluid distribution channel and an opening of which is controlled according to a supplied power, and the control unit controls the relative position of the changing unit by controlling the opening of the solenoid valve.

5. A control device for a vehicle height adjusting device, comprising:

a driving scene determination unit that determines a driving scene of a vehicle on the basis of driving information; and a control unit that controls a changing unit changing a relative position between a vehicle body of the vehicle and wheels of the vehicle in response to the determined driving scene, wherein a vehicle height on a front wheel side and a vehicle height on a rear wheel side can be set in three stages of high, medium, and low, the driving scene is selected from the group consisting of city street, winding road and expressway, when city street is selected, the vehicle heights on both the front and rear wheel sides are set to be medium, when winding road is selected, the vehicle height on the front wheel side is set to be medium and the vehicle height on the rear wheel side is set to be high, and when expressway is selected, the vehicle height on the front wheel side is set to be high and the vehicle height on the rear wheel side is set to be medium.

6. The control device for the vehicle height adjusting device according to claim 5, wherein the control unit performs control of changing at least one of a front wheel side relative position, which is a relative position between the vehicle body and a front wheel, and a rear wheel side relative position, which is a relative position between the vehicle body and a rear wheel, on the basis of a front wheel side target moving distance and a rear wheel side target moving distance, the front wheel side target moving distance is a target moving distance of the front wheel side relative position, the rear wheel side target moving distance is a target moving distance of the rear wheel side relative position, and the front wheel side target moving distance and the rear wheel side target moving distance are determined according to the driving scene.

7. A non-transitory computer readable medium storing a program for causing a computer used in a vehicle height adjusting device to execute a process for adjusting a vehicle height of a vehicle, the process comprising the steps of:

determining a driving scene of a vehicle on the basis of driving information, said driving scene selected from the group consisting of city street, winding road and expressway;

controlling a changing unit changing a relative position between a vehicle body of the vehicle and wheels of the vehicle in response to the determined driving scene:

setting the vehicle height on a front wheel side and the vehicle height on a rear wheel side in three stages of high, medium, and low;

setting the vehicle heights on both the front and rear wheel sides to be medium, when city street is selected;

setting the vehicle height on the front wheel side to be medium and the vehicle height on the rear wheel side to be high, when winding road is selected; and setting the vehicle height on the front wheel side to be high and the vehicle height on the rear wheel side to be medium, when expressway is selected.

* * * * *